US012676423B2

(12) United States Patent
Li et al.

(10) Patent No.: US 12,676,423 B2
(45) Date of Patent: Jul. 7, 2026

(54) ANTENNA SYSTEMS HAVING RADIATING ELEMENTS THEREIN THAT ARE PAIRED WITH HIGH PERFORMANCE LENSES

(71) Applicant: Outdoor Wireless Networks LLC, Claremont, NC (US)

(72) Inventors: Haifeng Li, Allen, TX (US); Peter J. Bisiules, LaGrange Park, IL (US); Rui An, Allen, TX (US); Chengcheng Tang, Murphy, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 56 days.

(21) Appl. No.: 18/945,697

(22) Filed: Nov. 13, 2024

(65) Prior Publication Data

US 2025/0070476 A1 Feb. 27, 2025

Related U.S. Application Data

(63) Continuation of application No. 17/875,518, filed on Jul. 28, 2022, now Pat. No. 12,170,404.

(Continued)

(51) Int. Cl.
*H01Q 19/06* (2006.01)
*H01Q 1/24* (2006.01)

(Continued)

(52) U.S. Cl.
CPC ........... *H01Q 19/062* (2013.01); *H01Q 1/246* (2013.01); *H01Q 15/02* (2013.01); *H01Q 21/062* (2013.01); *H01Q 21/26* (2013.01)

(58) Field of Classification Search
CPC .... H01Q 1/246; H01Q 15/02; H01Q 15/0026; H01Q 19/062; H01Q 21/062; H01Q 21/26

See application file for complete search history.

(56) References Cited

U.S. PATENT DOCUMENTS 6,317,095 B1 11/2001 Teshirogi et al.
2009/0010316 A1 1/2009 Rofougaran (Continued)

FOREIGN PATENT DOCUMENTS

WO 2020242783 A2 12/2020
WO 2021003081 A1 1/2021

OTHER PUBLICATIONS

Notification of Transmittal of the International Search Report and the Written Opinion of the International Searching Authority, or the Declaration, in corresponding PCT Application No. PCT/US2022/038841 (Dec. 9, 2022).

(Continued)

*Primary Examiner* — Daniel Munoz
(74) *Attorney, Agent, or Firm* — Myers Bigel, P.A.

(57) ABSTRACT

An antenna includes a radiating element on a forward-facing surface of an underlying reflector, and a lens extending in front of and within a radio frequency (RF) transmission path of the radiating element. The lens includes a two-dimensional array of lens elements having at least three rows and at least three columns therein. The array includes: a first row of equivalently-sized lens elements having geometric centers that are collinear with each other, a last row of equivalently-sized lens elements having geometric centers that are collinear with each other, and an intermediate row of lens elements having geometric centers that are collinear with each other. Each of the lens elements in the intermediate row includes a respective forward-facing metal surface having a respective metal opening therein.

17 Claims, 20 Drawing Sheets

Related U.S. Application Data

(60) Provisional application No. 63/283,699, filed on Nov. 29, 2021, provisional application No. 63/229,422, filed on Aug. 4, 2021.

(51) Int. Cl.

| | |
|---|---|
| ***H01Q 15/02*** | (2006.01) |
| ***H01Q 21/06*** | (2006.01) |
| ***H01Q 21/26*** | (2006.01) |

(56) References Cited

U.S. PATENT DOCUMENTS

| | | | | |
|---|---|---|---|---|
| 2012/0076498 | A1 | 3/2012 | Sayeed et al. | |
| 2016/0211906 | A1 | 7/2016 | Woodsum | |
| 2016/0240923 | A1 | 8/2016 | Oh et al. | |
| 2017/0062945 | A1 * | 3/2017 | Foo | H01Q 25/008 |
| 2017/0279202 | A1 | 9/2017 | Galla et al. | |
| 2018/0316090 | A1 * | 11/2018 | Foo | H01Q 15/002 |
| 2019/0103660 | A1 | 4/2019 | Zimmerman et al. | |
| 2020/0144719 | A1 | 5/2020 | Scarborough et al. | |

OTHER PUBLICATIONS

"A. A. Baba, R. M. Hashmi, K. P. Esselle, J. G. Marin and J. Hesselbarth, "Broadband Partially Reflecting Superstrate-Based Antenna for 60 GHz Applications," in IEEE Transactions on Antennas and Propagation, vol. 67, No. 7, pp. 4854-4859, Jul. 2019,".

"Extended European Search Report for European Application No. 22853746.0, dated May 13, 2025, 11 pages".

"W. Yu, Y. Yu, W. Wang, X. H. Zhang and G. Q. Luo, "Low-RCS and Gain-Enhanced Antenna Using Absorptive/Transmissive Frequency Selective Structure," in IEEE Transactions on Antennas and Propagation, vol. 69, No. 11, pp. 7912-7917, Nov. 2021".

* cited by examiner

ANTENNA SYSTEMS HAVING RADIATING ELEMENTS THEREIN THAT ARE PAIRED WITH HIGH PERFORMANCE LENSES

REFERENCE TO PRIORITY APPLICATIONS

The present application is a continuation of U.S. application Ser. No. 17/875,518, filed Jul. 28, 2022, now U.S. patent Ser. No. 12/170,404, which claims priority to U.S. Provisional Patent Application No. 63/229,422, filed Aug. 4, 2021, and to U.S. Provisional Patent Application No. 63/283,699, filed Nov. 29, 2021, the disclosures of which are hereby incorporated herein by reference

FIELD

The present invention relates to cellular communications systems and, more particularly, to antenna systems having arrays of radiating elements therein.

BACKGROUND

Lenses have been used in radio frequency (RF) antenna systems to provide some degree of beam steering and beam width control by, among other things, suppressing side lobe formation and enhancing antenna gain. As will be understood by those skilled in the art, semi-spherical optical lenses formed of dielectric materials may be mounted in front of corresponding radiating elements within an antenna, to provide limited beam steering and beam width control. In some cases, a spacing between the semi-spherical optical lens and a forward-facing surface of a radiating element (e.g., dipole radiator) may be comparable to a diameter of the semi-spherical optical lens.

In addition, as disclosed in U.S. Patent Publication No. 2016/0240923 to Oh et al., planar lenses may also be used to provide beam steering for RF signals in the millimeter-wave frequency bands. In particular, Oh et al. discloses a plurality of feed subarrays of antenna elements in combination with a plurality of lenses having different phase profiles. These lenses are provided within a planar aperture, which controls beam steering of the multiple beams generated by the subarrays of antenna elements.

SUMMARY

An antenna according to embodiments of the invention utilizes a single-element or multi-element broadband lens for each of a plurality of radiating elements (e.g., cross-dipole radiating elements) within the antenna. Advantageously, the broadband lenses may be configured to provide a high degree of selective focusing of radio frequency (RF) signals within one frequency band relative to RF signals within another frequency band, and may enable a reduction in a total number of radiating elements needed to support a desired beam pattern(s). According to some of these embodiments, an antenna may include a radiating element on a forward-facing surface of an underlying reflector, and a single-element or multi-element, planar, broadband lens in front of (and within a RF transmission path of) the radiating element. Advantageously, a spacing between the planar broadband lens and the radiating element is less than one-half (or possibly even one-quarter) a diameter of a smallest circle enclosing the planar lens. Moreover, this spacing can be changed to accommodate different frequency bands and/or have different impact on beamwidth control. For example, a larger spacing could be used for a different band (e.g., V-band versus S-band) to get the same desired impact on beamwidth control.

A multi-element broadband lens includes first lens elements having first RF characteristics and second lens elements having second RF characteristics, which are different from the first RF characteristics. In some embodiments, the first lens elements are arranged into a two-dimensional array, which is encircled by the second lens elements. In other embodiments, the first lens elements are surrounded on at least two sides thereof by the second lens elements. The multi-element broadband lens may be embedded within a planar substrate, which includes a dielectric layer and first and second pluralities of electrically conductive layers on first and second opposing surfaces of the dielectric layer, respectively. This dielectric layer may be a printed circuit board (PCB) in some embodiments.

According to additional embodiments of the invention, each of the first lens elements includes a first LC circuit, and each of the second lens elements includes a second LC circuit. In addition, each of the first lens elements may include a forward-facing metal layer, a rear-facing metal layer, and an intermediate metal layer extending between the forward and rear-facing metal layers. This intermediate metal layer may have a slot therein, such as a first serpentine-shaped slot. Similarly, each of the second lens elements may include a forward-facing metal layer, a rear-facing metal layer, and an intermediate metal layer extending between the forward and rear-facing metal layers. This intermediate metal layer may have a second serpentine-shaped slot therein that is smaller than the first serpentine-shaped slot, so that an inductance in the second LC circuit is less than an inductance in the first LC circuit.

According to further embodiments of the invention, the multi-element broadband lens includes first lens elements having first RF characteristics and second lens elements having second RF characteristics, which are different from the first RF characteristics. In addition, at least one of first lens elements includes: (i) a first metal frame having a first spiral inductor electrically coupled thereto, and (ii) a second metal frame having a second spiral inductor electrically coupled thereto. The first and second metal frames may be separated from each other by a dielectric layer, and an end of the first spiral inductor may be electrically coupled to an end of the second spiral inductor. For example, the first spiral inductor may extend opposite the second spiral inductor, and an end of the first spiral inductor may be electrically coupled by a plated through hole (PTH) in the dielectric layer to the end of the second spiral inductor.

In other embodiments of the invention, the multi-element broadband lens may be embedded within a planar substrate having a rectangular shape, and the first lens elements may be arranged into a central N×N array of first lens elements within the planar substrate, where N is a positive integer greater than one. This N×N array may also be surrounded on four sides by a rectangular ring of second lens elements, which are smaller in lateral dimensions relative to the first lens elements. In some of these embodiments, the planar substrate is square shaped, and a spacing between the multi-element broadband lens and the radiating element is less than one-quarter a width of the planar substrate. In addition, each of the first lens elements may be configured to include first and second metal layers on forward-facing and rear-facing surfaces of the planar substrate, respectively. Each of the first lens elements may also include an intermediate metal layer within the planar substrate, which extends between the corresponding first and second metal layers, and has a slot therein, which functions as a RF inductor.

According to still further embodiments of the invention, a twinbeam antenna is provided, which includes a bent reflector having a generally inverted V-shaped cross-section. A first linear array of radiating elements is provided on a first side of the bent reflector, and a second linear array of radiating elements is provided on a second side of the bent reflector. A first linear array of multi-element broadband lenses is provided in front of the first linear array of radiating elements, and a second linear array of multi-element broadband lenses is provided in front of the second linear array of radiating elements. In addition, each of the multi-element broadband lenses in the first and second linear arrays may include first lens elements having first RF characteristics and second lens elements having second RF characteristics, which are different from the first RF characteristics. The first lens elements may be grouped into a plurality of N×N arrays of first lens elements, where N is a positive integer greater than one, and each of the N×N arrays of first lens elements may extend in front of a corresponding radiating element within the first and second linear arrays thereof. Each of the N×N arrays of first lens elements may also extend between a corresponding pair of linear arrays of the second lens elements.

According to still further embodiments of the invention, an antenna is provided, which includes a radiating element (e.g., dipole, patch) on a forward-facing surface of an underlying reflector, and at least two multi-element broadband lenses in front of and within a radio frequency (RF) transmission path of the radiating element. The at least two multi-element broadband lenses includes: (i) a first multi-element broadband lens at a first distance from the radiating element, and (ii) a second multi-element broadband lens extending between the first multi-element broadband lens and the radiating element. These first and second multi-element broadband lenses may be planar lenses, in some embodiments of the invention; however, non-planar lenses (e.g., concave-shaped (facing the radiating element), etc.) may also be used in other embodiments of the invention.

According to some of these embodiments, the first distance is in a range from 0.75 times λ/4 to 1.25 times λ/4, where λ is a wavelength corresponding to a center frequency ($f_c$) of a broadband radio-frequency (RF) signal transmitted by the radiating element when active. According to other ones of these embodiments, the first distance is in a range from 0.75 times λ/2 to 1.25 times λ/2, where λ is a wavelength corresponding to a center frequency ($f_c$) of a broadband radio-frequency (RF) signal transmitted by the radiating element when active. In addition, the second multi-element broadband lens may extend at a second distance from the radiating element, and this second distance may be in a range from 0.75 times λ/4 to 1.25 times λ/4.

According to further embodiments of the invention, the first distance is in a range from 0.75 times λ/n to 1.25 times λ/n, where λ is a wavelength corresponding to a center frequency ($f_c$) of a broadband radio-frequency (RF) signal transmitted by the radiating element when active, and n equals two or four. In addition, the second multi-element broadband lens extends at a second distance from the radiating element, and this second distance is in a range from 0.75 times λ/2n to 1.25 times λ/2n. Moreover, the at least two multi-element broadband lenses may include a third multi-element broadband lens extending between the second multi-element broadband lens and the radiating element.

According to additional embodiments of the invention, the first multi-element broadband lens is configured to include an M×N array of lens elements, where M is a positive integer greater than two, and N is a positive integer greater than two. In some of these embodiments, M=N, but in other embodiments M≠N. The multi-element broadband lens may also include first lens elements having first RF characteristics and second lens elements having second RF characteristics, which are different from the first RF characteristics. In some of these embodiments, the first lens elements are arranged as a plurality of the first lens elements, which are encircled by an array of the second lens elements. For example, the first lens elements may be arranged as a two-dimensional array of the first lens elements, and the second lens elements may be arranged to extend along two opposing sides, or all four sides, of the two-dimensional array of the first lens elements.

According to further embodiments of the invention, at least one of the lens elements in the multi-element broadband lens includes a parallel LC circuit within the RF transmission path. The lens may also be embedded within a planar substrate, which may include a dielectric layer, such as a printed circuit board (PCB), and first and second pluralities of electrically conductive layers on first and second opposing surfaces of the dielectric layer, respectively. In some of these embodiments of the invention, the parallel LC circuit may be configured from a forward-facing metal layer, a rear-facing metal layer, and an intermediate metal layer extending between the forward and rear-facing metal layers. This intermediate metal layer may have a slot therein, such as a serpentine-shaped slot, or a U-shaped slot, for example.

DETAILED DESCRIPTION

Figure 1A:
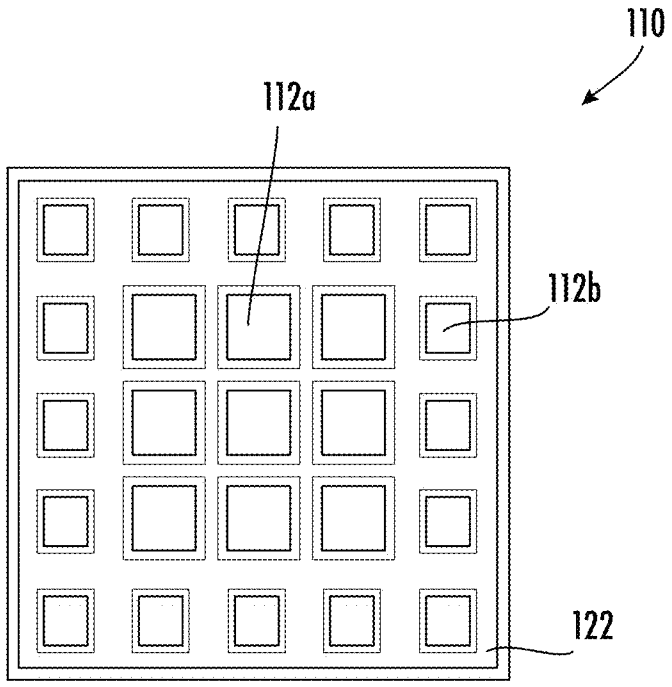
FIG. 1A is a plan view of a multi-element broadband lens, according to an embodiment of the invention.

The present invention now will be described more fully with reference to the accompanying drawings, in which example embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
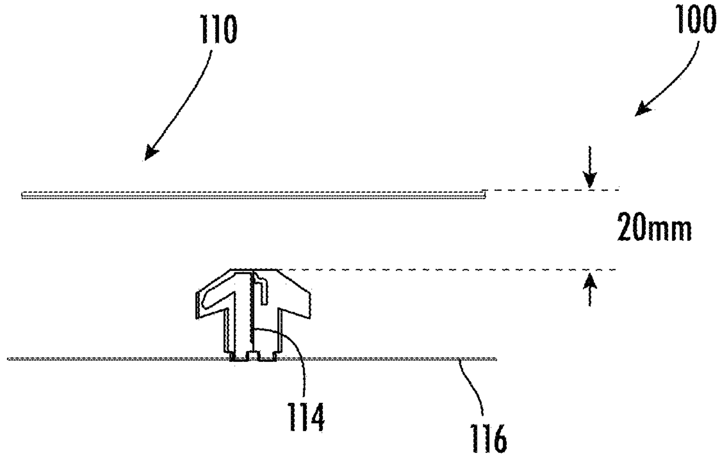
FIG. 1B is a side perspective view of an antenna including a reflector, cross-polarized dipole radiating element and the multi-element broadband lens of FIG. 1A, according to an embodiment of the invention.

Referring now to FIGS. 1A-1E, an antenna 100 according to an embodiment of the invention is illustrated as including a multi-element, planar, broadband lens 110 in front of, and within a radio frequency (RF) transmission path of a radiating element 114, which is mounted on (e.g., above) a forward-facing surface of an underlying reflector 116. As shown by the embodiment of FIGS. 1A-1B, a forward facing surface of the radiating element 114, which may be configured as a cross-polarized dipole radiating element, for example, is spaced apart from the multi-element broadband lens 110 by a fixed distance (e.g., 20 mm). In addition, the multi-element broadband lens 110 is illustrated as having a rectangular (e.g., square) shape when viewed from a plan perspective, with lateral dimensions equivalent to 110 mm×110 mm. These lateral dimensions yield a diagonal length equivalent to $110(2)^{1/2}$ mm. Thus, the spacing distance of 20 mm is equivalent to 0.13 times the diagonal length of the multi-element broadband lens 110; and, this diagonal length corresponds to a diameter of a smallest circle enclosing the broadband lens 110. In alternative embodiments, the spacing distance may be less than one-quarter, or possibly less than one-half the diameter of the smallest circle enclosing the broadband lens 110. Advantageously, a beamwidth associated with the broadband lens 110 and radiating element 114 can be changed by changing a spacing between the broadband lens 110 and the forward facing surface of the radiating element 114 and/or varying a number of lens elements, as described hereinbelow, within the planar lens 110. These two degrees of freedom (spacing, number) can yield an antenna having smaller dimensions (e.g., thinner, narrower).

Figure 1C:
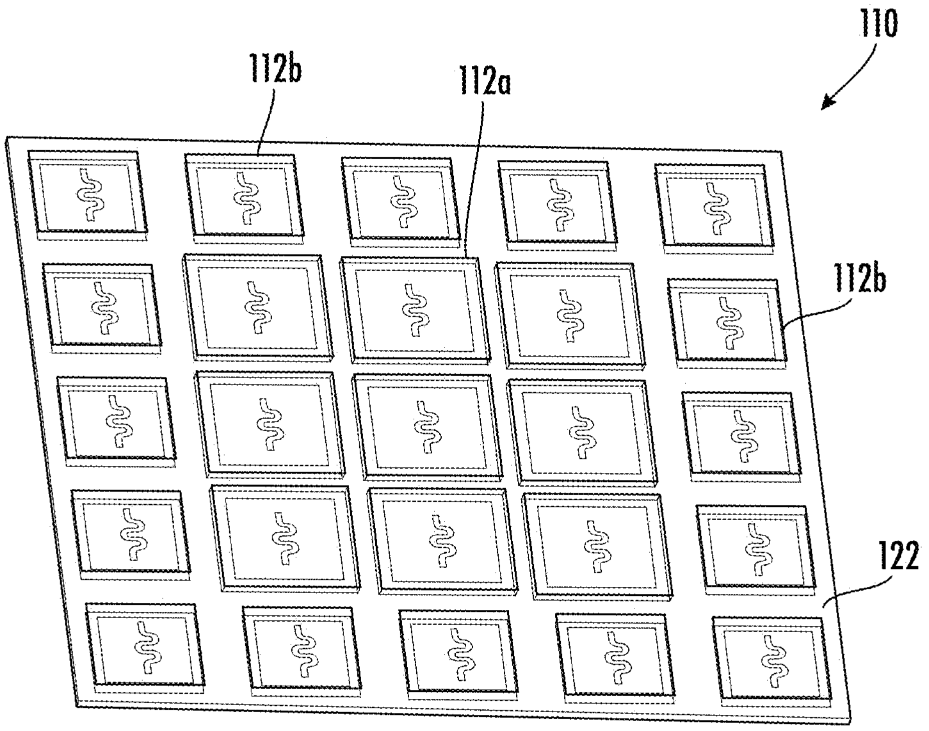
FIG. 1C is a perspective view of the multi-element broadband lens of FIG. 1A, according to an embodiment of the invention.
Figure 1D:
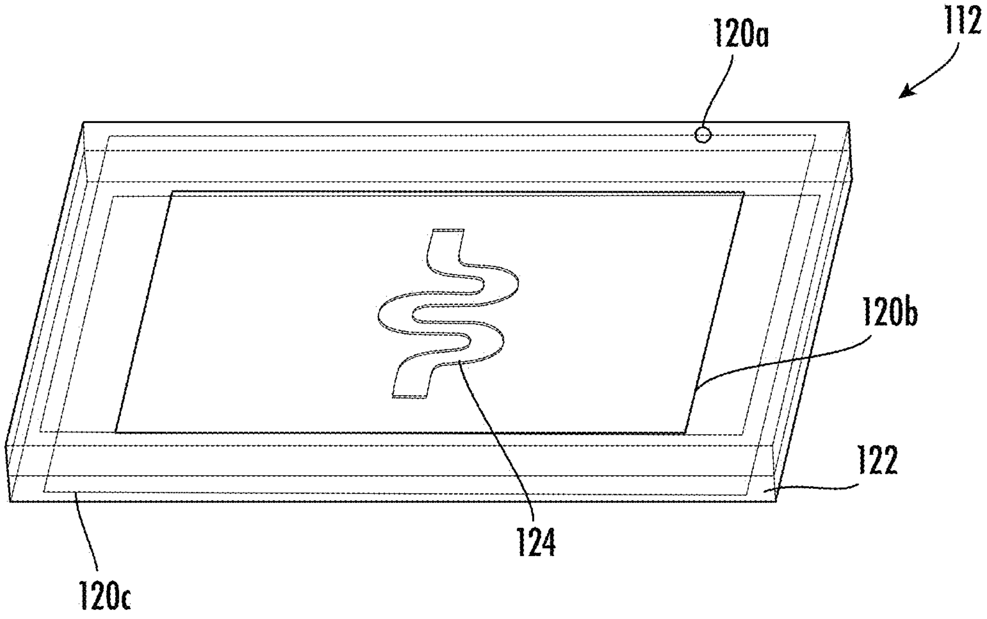
FIG. 1D is a perspective view of a lens element within the multi-element broadband lens of FIG. 1C, according to an embodiment of the invention.

Referring now to FIGS. 1A and 1C-1D, the multi-element broadband lens 110 includes first lens elements 112*a* having first RF characteristics and second lens elements 112*b* having second RF characteristics, which are different from the first RF characteristics. As shown, these first lens elements 112*a* are arranged into a two-dimensional array, which is encircled by the second lens elements 112*b*. According to some embodiments, this two-dimensional array may be an N×N array, such as a 2×2 array, or a 3×3 array, as shown; however, other "central" arrangements of the first lens elements 112*a* are also possible. In other embodiments, the second lens elements 112*b* are aligned along sides of a square ring of lens elements having five (5) elements 112*b* to a side (with shared corner elements) for a total of 16 lens elements 112*b*, as shown.

Figure 1E:
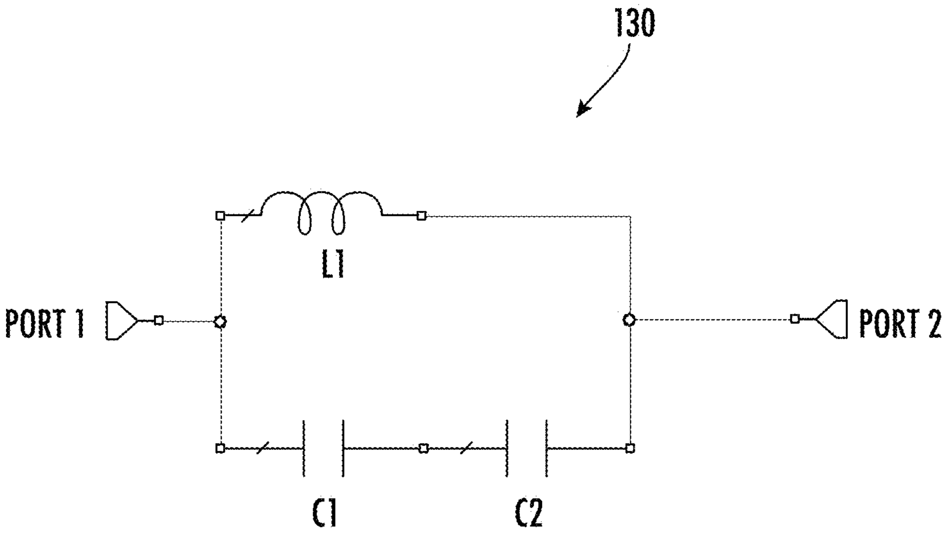
FIG. 1E is a simplified electrical schematic of the lens element of FIG. 1D.

In addition, each multi-element broadband lens 110 may be embedded within a planar substrate, which may include a dielectric layer 122, such as a plastic or printed circuit board (PCB) having a suitable thickness and dielectric constant for a particular application. Referring now to FIG. 1C-1D, each of the first lens elements 112*a* is configured to include a corresponding first LC circuit within a central portion of the dielectric layer 122, and each of the laterally smaller second lens elements 112*b* is configured to include a corresponding second LC circuit within a peripheral portion of the dielectric layer 122. And, as best shown by the lens element "unit cell" 112 of FIG. 1D, each of the lens elements 112*a*, 112*b* may include a forward-facing electrically conductive/metal layer 120*a*, a rear-facing electrically conductive/metal layer 120*c*, and an intermediate electrically conductive/metal layer 120*b*. This intermediate metal layer 120*b* is embedded within the dielectric layer 122 and extends, in parallel, between the forward and rear-facing metal layers 120*a*, 120*c*, which may be formed as patterned metallization layers on opposing planar surfaces the dielectric layer 122. According to some embodiments of the invention, the intermediate metal layer 120*b* may have a slot 124 therein of predetermined length, width and shape to achieve, in combination with the forward and read-facing metal layers 120*a*, 120*c*, a desired, frequency-dependent, LC circuit characteristic within the corresponding lens element 112*a*, 112*b*. As shown by example, this slot 124 may have a serpentine-shape, which is larger (and supports a larger inductance "L") in the first lens element 112*a* relative to the second lens element 112*b*; however, other shapes (e.g., U-shape) are also possible in alternative embodiments of the invention. Moreover, as illustrated by FIG. 1E, these respective LC circuits within the lens elements 112*a*, 112*b* may be modeled as an LC circuit 130 having a parallel-connected combination of: (i) an inductor L1, and (ii) series-connected capacitors C1, C2, which are based on the overlapping forward, intermediate, and rear metal layers 120*a*-120*c*. As will be understood by those skilled in the art, in the modeled LC circuit 130, the input and output ports (Port 1, Port 2) correspond to the opposing rear-facing and forward-facing sides of each lens element 112.

Referring again to FIG. 1B, in the event the radiating element 114 is set at 1.5 wavelengths from the underlying reflector 116, then the beam pattern (without planar lens 110) in a lower band will typically have a narrower beamwidth and the beam pattern in a higher band will typically have a wider beamwidth. Thus, to provide a similar beamwidth across all the frequencies of the lower and higher bands, the sizes of the lens elements 112*a*, 112*b* can be adjusted to provide similar lower frequency and higher frequency beamwidths.

Figure 2A:
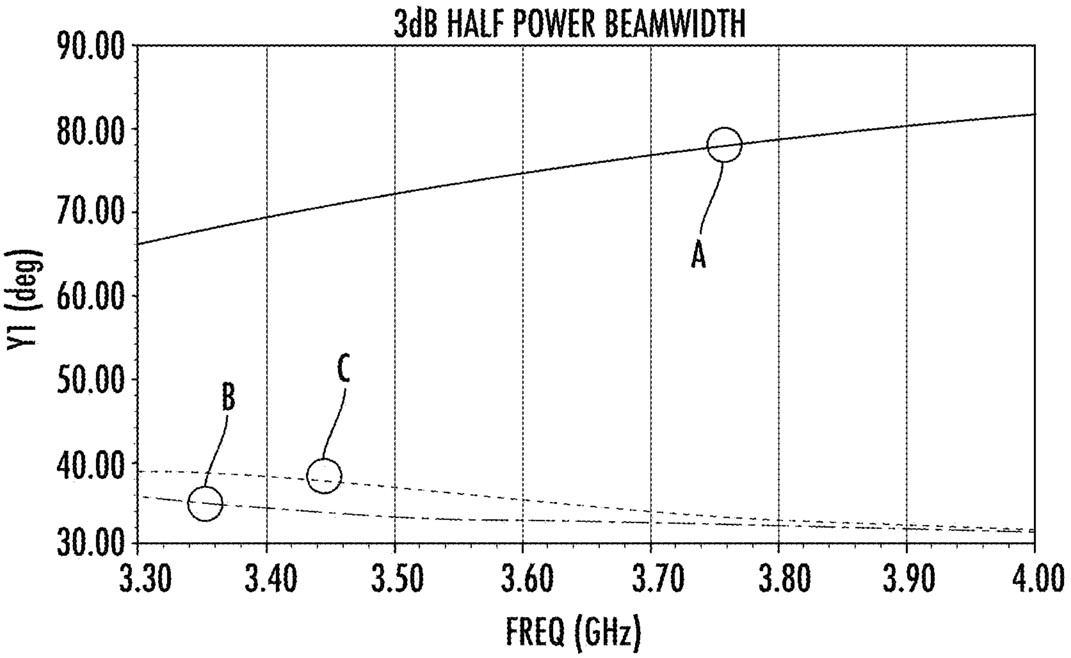
FIG. 2A is a graph of 3 dB half-power beamwidth versus frequency, which compares performance of the antenna of FIGS. 1A-1B relative to two conventional antennas.
Figure 2B:
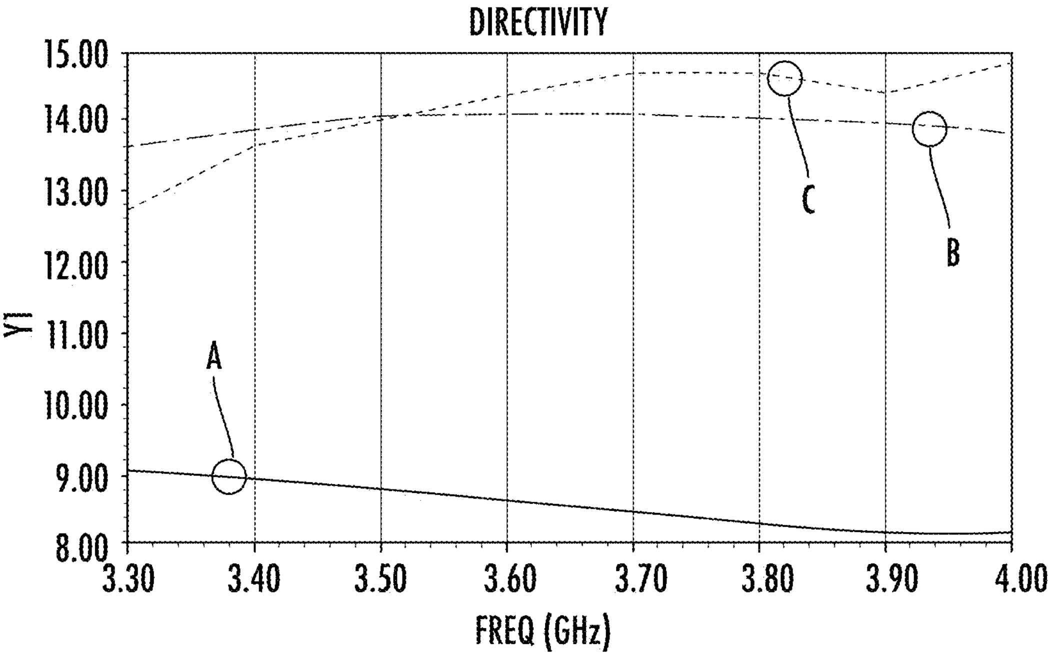
FIG. 2B is a graph of directivity versus frequency, which compares performance of the antenna of FIGS. 1A-1B relative to two conventional antennas.

Referring now to the graphs of FIGS. 2A-2B, a performance comparison is provided between the antenna 100 of FIGS. 1A-1B relative to two conventional antennas. In particular, in FIG. 2A, a 3 dB half-power beamwidth comparison is made between three antenna designs, with: (i) curve A corresponding to the dipole radiating element of FIG. 1B, but without any broadband (or other) lens, (ii) curve B corresponding to the dipole radiating element of FIG. 1B, but with the broadband lens 110 replaced with a semi-spherical optical lens (having a diameter of 110 mm, and spaced at a distance of 122 mm from the dipole radiating element), and (iii) curve C corresponding to the antenna 100 of FIGS. 1A-1B. Likewise, in FIG. 2B, a directivity comparison is made between the three antenna designs, with: (i) curve A corresponding to the dipole radiating element of FIG. 1B, but without any lens, (ii) curve B corresponding to the dipole radiating element of FIG. 1B, but with the broadband lens 110 replaced with a semi-spherical optical lens (having a diameter of 110 mm, and spaced at a distance of 122 mm from the dipole radiating element), and (iii) curve C corresponding to the antenna 100 of FIGS. 1A-1B. As shown, the antenna 100 of FIGS. 1A-1B advantageously provides a relatively narrow beamwidth that is comparable to the use of an optical lens with large spacing (e.g., 122 mm), and provides a somewhat higher directivity, at relatively high frequency, relative to the use of an optical lens.

Figure 3A:
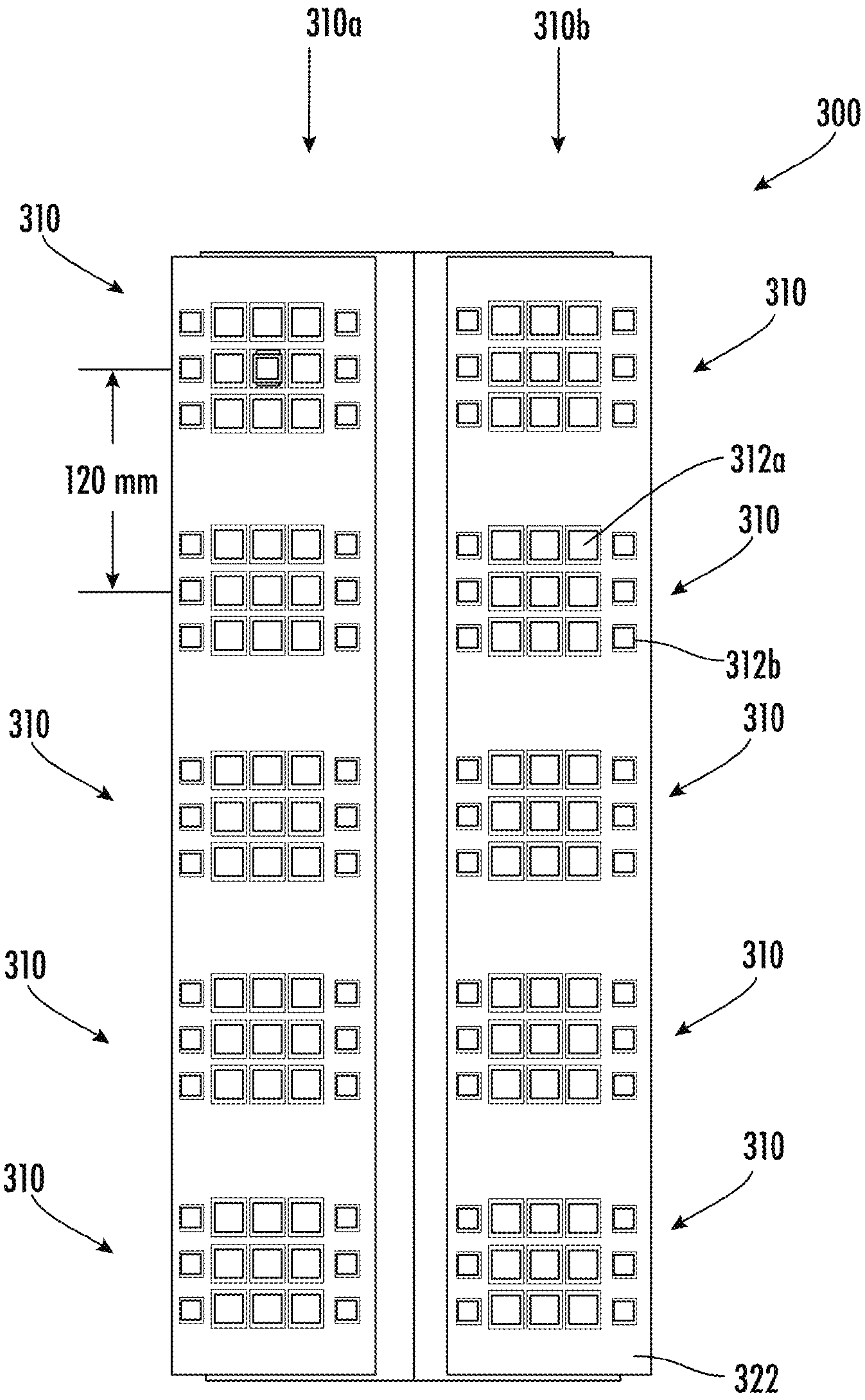
FIG. 3A is a plan view of a twinbeam antenna, which utilizes multi-element broadband lenses according to an embodiment of the invention.
Figure 3B:
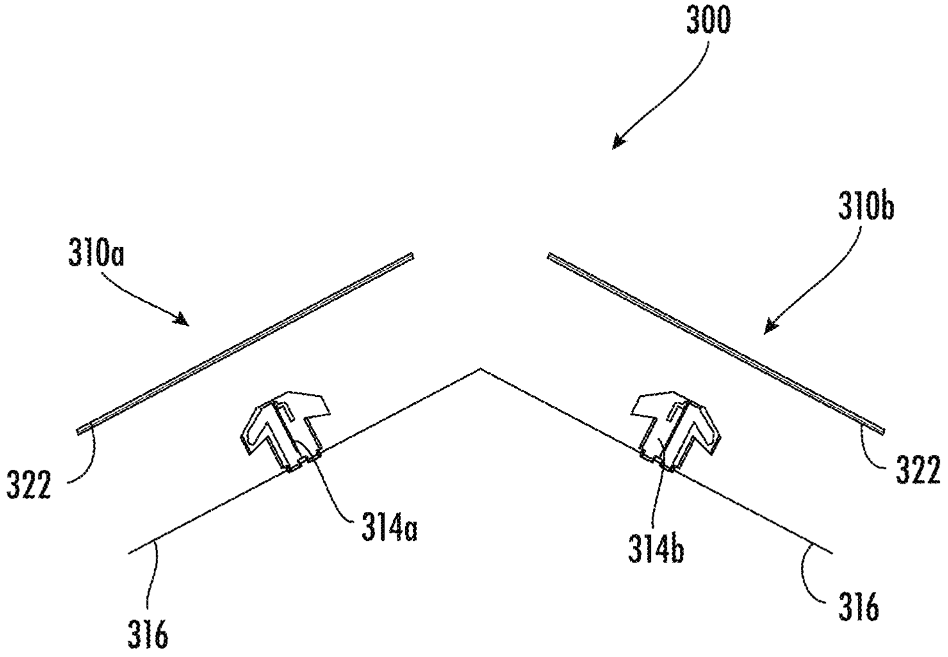
FIG. 3B is a plan view of the twinbeam antenna of FIG. 3A.

Referring now to FIGS. 3A-3B, a twinbeam antenna 300 according to an embodiment of the invention is illustrated as including a bent reflector 316 having a generally inverted V-shaped cross-section. A first linear array of radiating elements 314*a* is provided on a first side (e.g., left side) of the bent reflector 316, and a second linear array of radiating elements 314*b* is provided on a second side (e.g., right side) of the bent reflector 316. In addition, a first linear array 310*a* of multi-element broadband lenses 310 is provided in front of the first linear array of radiating elements 314*a*, and a second linear array 310*b* of multi-element broadband lenses 310 is provided in front of the second linear array of radiating elements 314*b*. As shown, each of the multi-element broadband lenses 310 in the first and second linear arrays 310*a*, 310*b* may include first lens elements 312*a* having first RF characteristics and second lens elements

312*b* having second RF characteristics, which are different from the first RF characteristics. The first lens elements 312*a* may be grouped into a plurality of N×N arrays of first lens elements 312*a*, where N is a positive integer greater than one (e.g., N=3), and each of the N×N arrays of first lens elements 312*a* may extend between a corresponding pair of linear arrays of the second lens elements 312*b*, which contain three (3) lens elements 312*b* per linear array on opposing sides of the N×N arrays of larger lens elements 312*a*. These lens elements 312*a*, 312*b* may be configured as illustrated by the lens element 112 of FIG. 1D.

Moreover, a comparison of the twinbeam antenna 300 of FIG. 3A versus a corresponding antenna having a bent reflector 316 and ten (10) radiating elements 314*a* in a first linear array and ten (10) radiating elements 314*b* in a second linear array, demonstrates a 33° beamwidth with higher cross-polarization and higher front-to-back ratio (FBR) for the antenna of FIG. 3A, versus a 65° beamwidth for the bent reflector 316 with two linear arrays of 10 radiating elements 314*a* (and no planar lens elements).

Figure 4A:
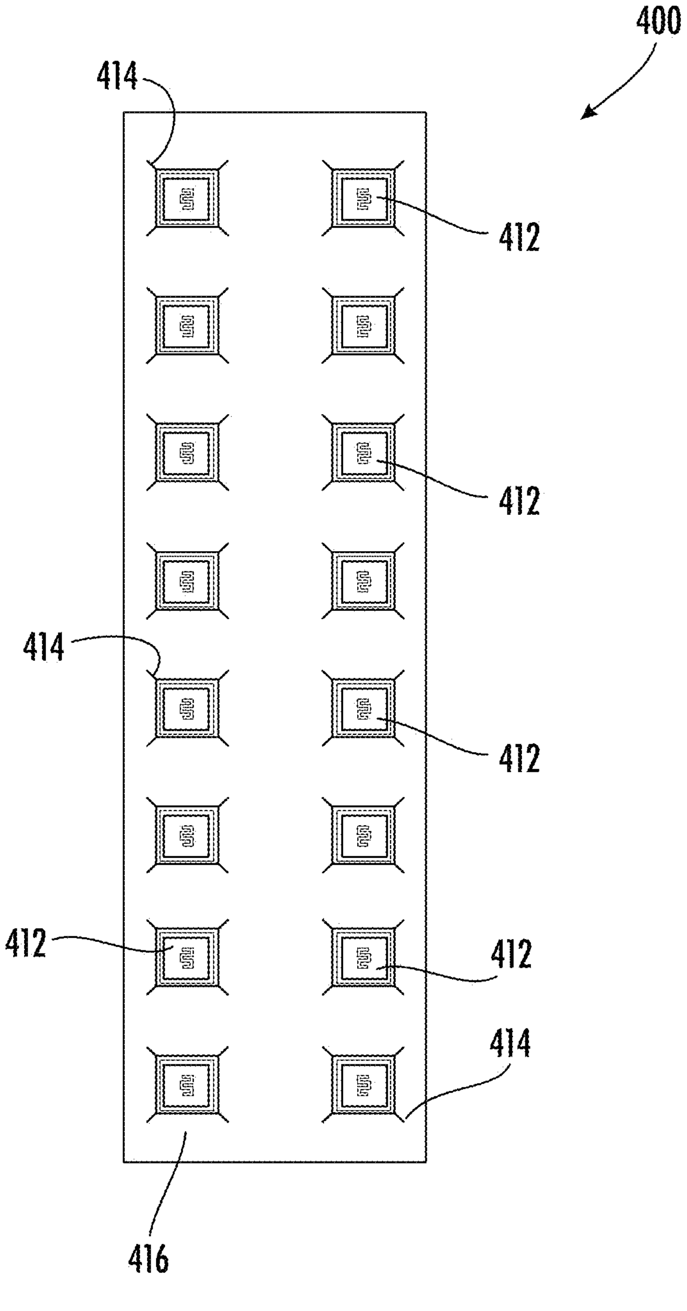
FIG. 4A is a plan view of an antenna containing side-by-side linear arrays of cross-polarized dipole radiating elements and planar lenses, according to an embodiment of the invention.
Figure 4B:
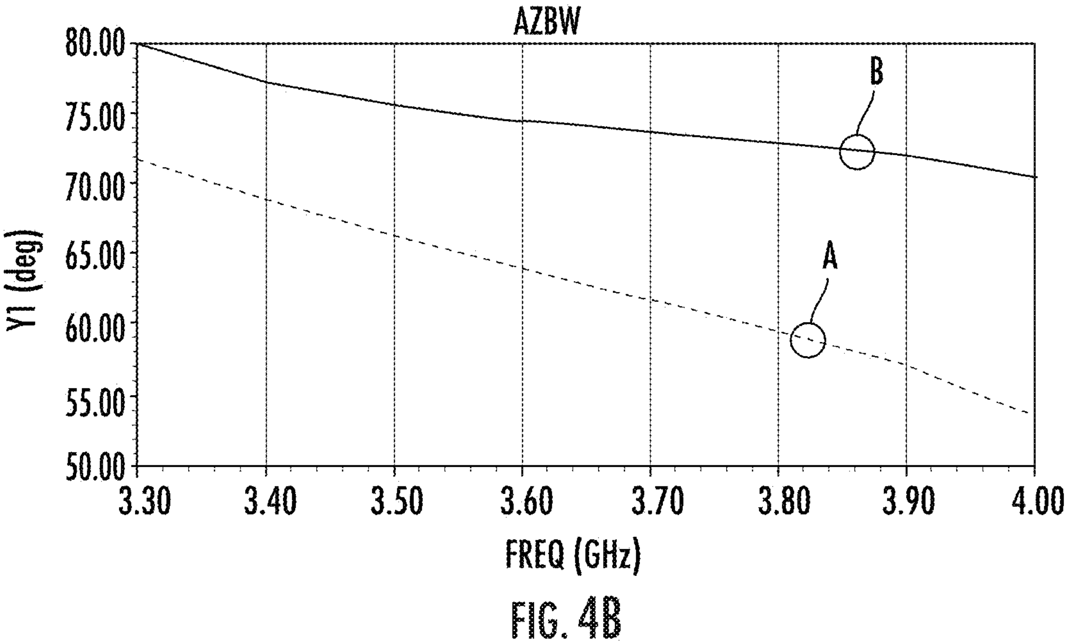
FIG. 4B is a graph of 3 dB half-power beamwidth versus frequency, which compares performance of the antenna of FIG. 4A relative to an otherwise equivalent antenna without planar lenses.
Figure 4C:
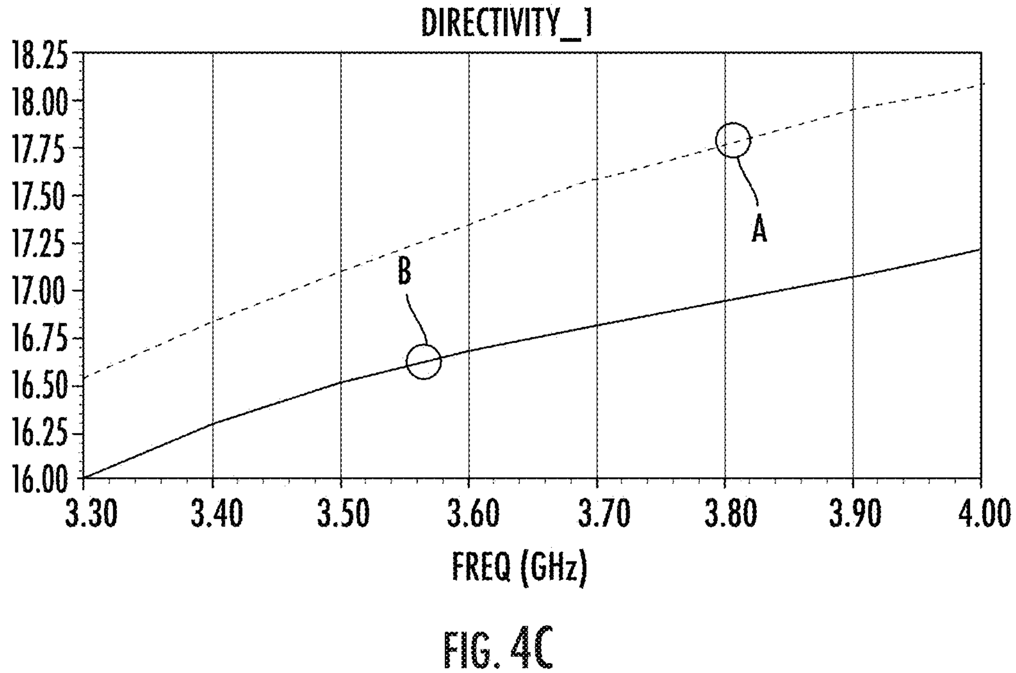
FIG. 4C is a graph of directivity versus frequency, which compares performance of the antenna of FIG. 4A relative to an otherwise equivalent antenna without planar lenses.
Figure 4D:
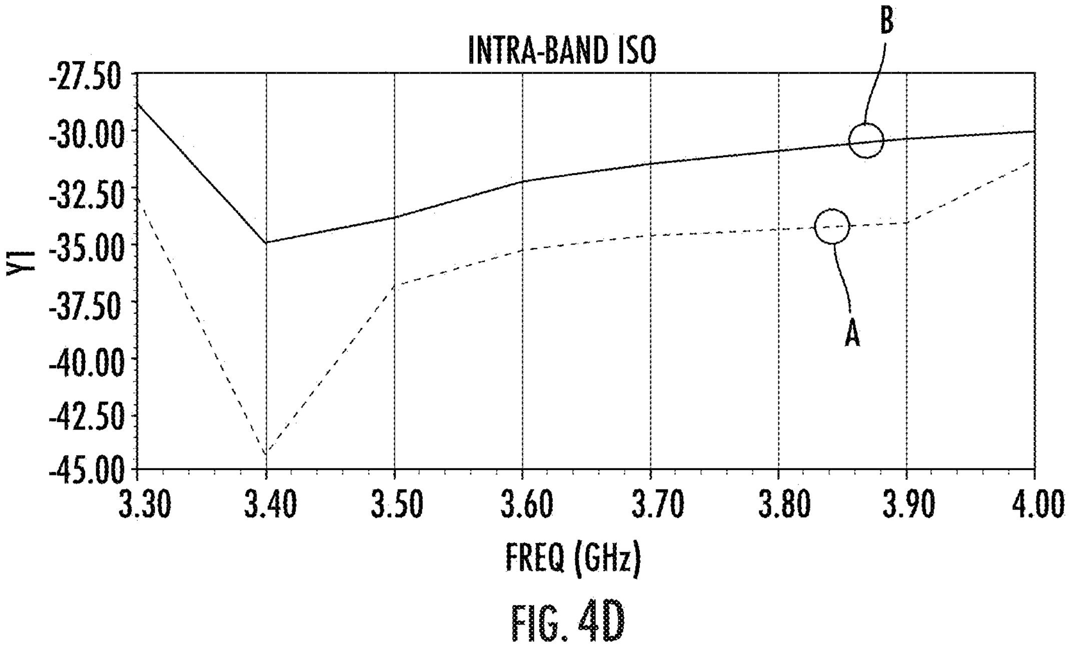
FIG. 4D is a graph of intra-band isolation versus frequency, which compares performance of the antenna of FIG. 4A relative to an otherwise equivalent antenna without planar lenses.
Figure 4E:
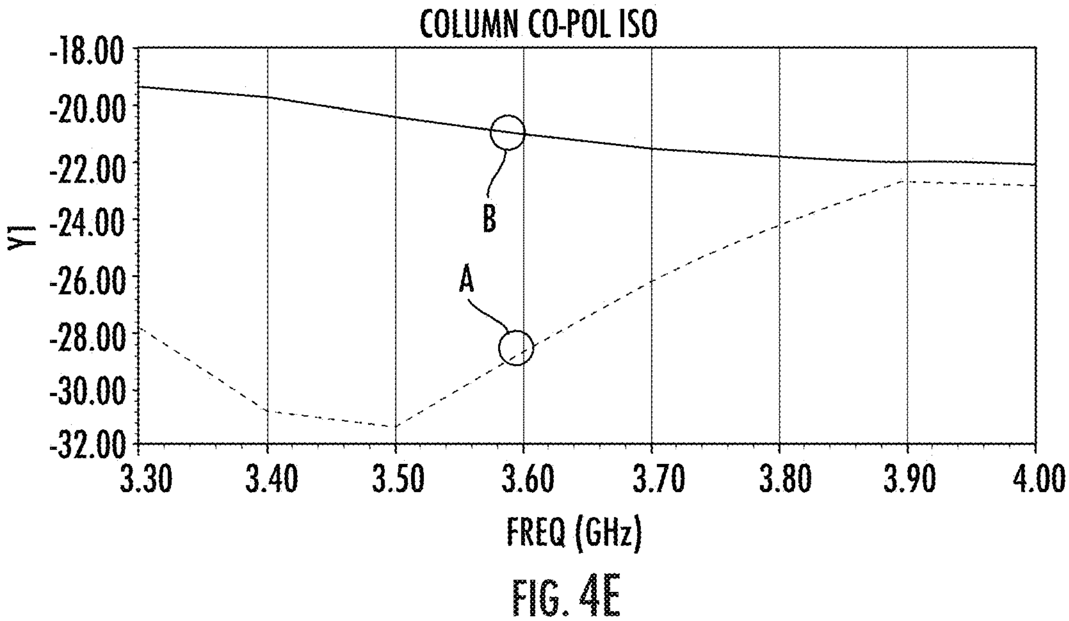
FIG. 4E is a graph of co-polarization isolation versus frequency, which compares performance of the antenna of FIG. 4A relative to an otherwise equivalent antenna without planar lenses.
Figure 4F:
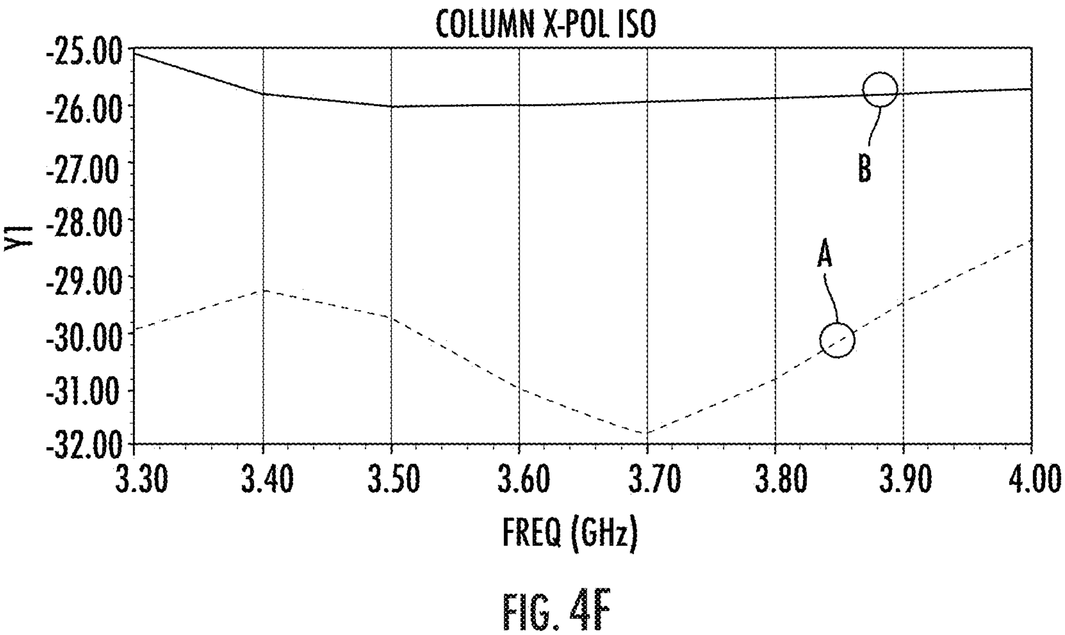
FIG. 4F is a graph of cross-polarization isolation versus frequency, which compares performance of the antenna of FIG. 4A relative to an otherwise equivalent antenna without planar lenses.

Referring now to FIG. 4A, an antenna 400 according to another embodiment of the invention is illustrated as including two side-by-side linear arrays of cross-polarized dipole radiating elements 414 on an underlying reflector 416, and two corresponding linear arrays of single-element planar lenses 412 (see, e.g., FIG. 1D) mounted, in close proximity, in front of the radiating elements 414 (see, e.g., FIG. 1B). As shown by FIGS. 4B-4F, the antenna 400 of FIG. 4A provides multiple performance advantages over an otherwise equivalent antenna, which omits the planar lenses 412. For example, each of the graphs of: (i) 3 dB half-power beamwidth versus frequency (FIG. 4B), (ii) directivity versus frequency (FIG. 4C), (iii) intra-band isolation versus frequency (FIG. 4D), (iv) column-to-column co-polarization isolation versus frequency (FIG. 4E), and (v) column-to-column cross-polarization isolation versus frequency (FIG. 4F), shows a pair of curves: A and B. In particular, the "A" curves show various performance characteristics of the antenna 400 of FIG. 4A, and the "B" curves show the corresponding performance characteristics of an otherwise equivalent antenna that omits the planar lenses 412. In summary, the antenna 400 of FIG. 4A has a narrower beamwidth (azimuth direction), higher directivity, and better: intra-band isolation, co-polarization isolation and cross-polarization isolation.

Figure 5A:
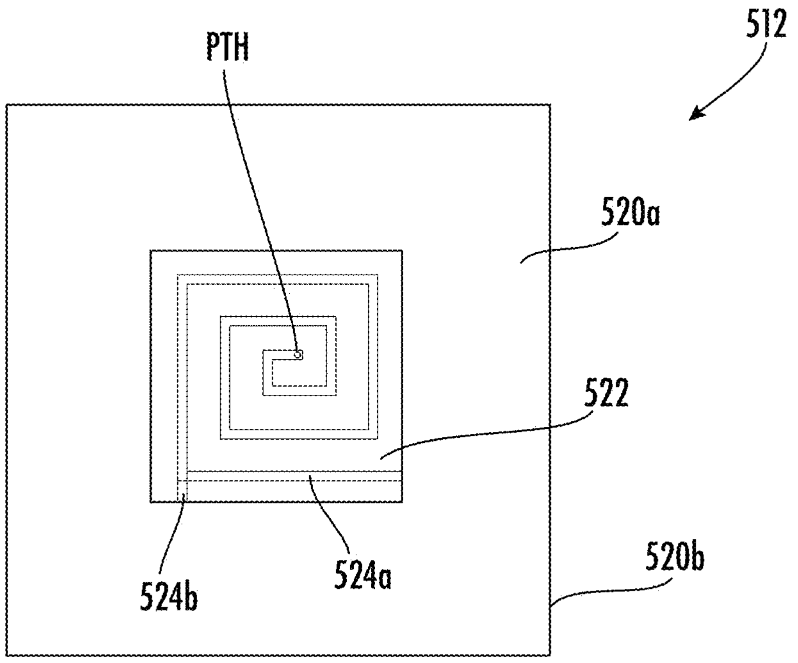
FIG. 5A is a plan view of a planar lens with spiral inductors, according to an embodiment of the invention.
Figure 5B:
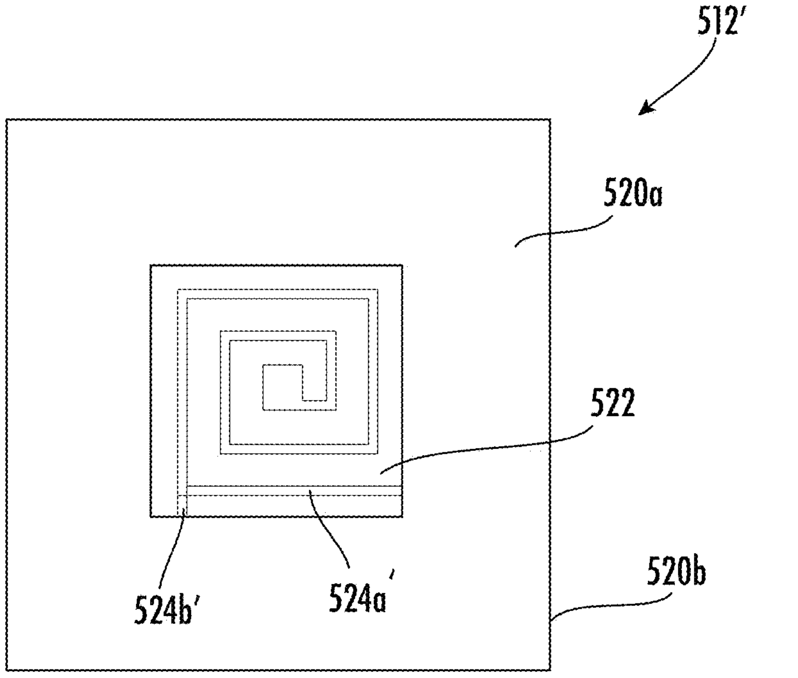
FIG. 5B is a plan view of a planar lens with spiral inductors, according to an embodiment of the invention.

Referring now to FIGS. 5A-5B, a pair of lens elements 512, 512' are provided as alternative embodiments to the lens element "unit cell" 112 of FIG. 1D, which may be utilized within the multi-element broadband lenses 110, 310 described herein. In FIG. 5A, the lens element 512 is illustrated as including a planar dielectric layer 522 having forward-facing and rear-facing, square, metal frames 520*a*, 520*b* on opposing surfaces thereof. And, in a center of a "first" metal frame 520*a*, a first spiral inductor 524*a* is provided on a first surface of the dielectric layer 522. Likewise, in a center of a "second" metal frame 520*b*, a second spiral inductor 524*b* is provided on a second, opposing, surface of the dielectric layer 522. As shown, the first spiral inductor 524*a* has a first end connected to an inner portion of the first metal frame 520*a*, and the second spiral inductor 524*b* has a first end connected to an inner portion of the second metal frame 520*b*. In addition, a second "inner" end of the first spiral inductor 524*a* is electrically coupled by a plated through-hole (PTH) within the dielectric layer 522 to a second "inner" end of the second spiral inductor 524*b*. In this manner, the dimensions of the "mirror-image" metal frames 520*a*, 520*b*, the length and width of the spiral inductors 524*a*, 524*b*, and thickness and composition of the dielectric layer 522 collectively define an LC circuit within the lens element 512. Referring now to FIG. 5B, an additional lens element 512' is illustrated, which is essentially identical to the lens element 512 of FIG. 5A. However, the second ends of the spiral inductors 524*a*', 524*b*' include a somewhat larger area metal trace/pad, which provides capacitive coupling therebetween (and eliminates the cost/complexity of using a PTH and lowers passive intermodulation (PIM) risk).

Figure 6A:
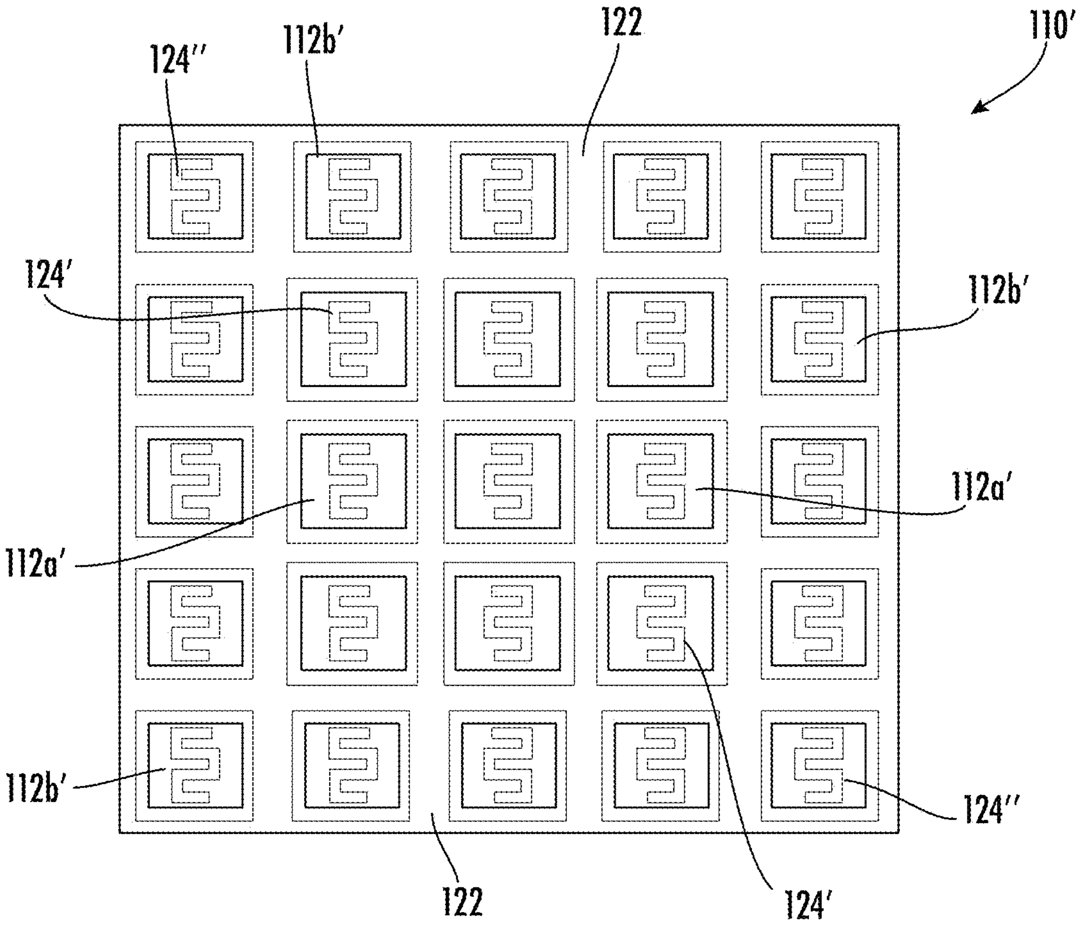
FIG. 6A is a plan view of a 5×5, multi-element, broadband lens, according to an embodiment of the invention.

Referring now to FIG. 6A, a square, 5×5, multi-element, broadband lens 110' according to another embodiment of the invention is illustrated as including first lens elements 112*a*' having first RF characteristics, which are encircled by a square ring of second lens elements 112*b*' having second RF characteristics, which may be different from the first RF characteristics. As described hereinabove with respect to FIGS. 1A-1E, the broadband lens 110' of FIG. 6A includes first lens elements 112*a*' that are arranged into a two-dimensional array, which is encircled by the second lens elements 112*b*. This two-dimensional array may be an N×N array, such as a 2×2 array, or a 3×3 array, as shown; however, other "central" arrangements of the first lens elements 112*a*' are also possible. Each multi-element broadband lens 110' may be embedded within a planar substrate, which may include a dielectric layer 122, such as a plastic or printed circuit board (PCB) having a suitable thickness and dielectric constant for a particular application. Thus, each of the first lens elements 112*a*' may be configured to include a corresponding first LC circuit within a central portion of the dielectric layer 122, and each of the laterally smaller second lens elements 112*b*' may be configured to include a corresponding second LC circuit within a peripheral portion of the dielectric layer 122.

Moreover, as best shown by the lens element "unit cell" 112 of FIG. 1D, each of the lens elements 112*a*', 112*b*' may include a forward-facing electrically conductive/metal layer 120*a*, a rear-facing electrically conductive/metal layer 120*c*, and an intermediate electrically conductive/metal layer 120*b*. This intermediate metal layer 120*b* may have a slot 124 therein of predetermined length, width and shape to achieve, in combination with the forward and read-facing metal layers 120*a*, 120*c*, a desired, frequency-dependent, LC circuit characteristic within the corresponding lens element 112*a*', 112*b*'. And, as shown by FIG. 6A, the corresponding slots 124', 124" may have a serpentine-shape, which is larger (and supports a larger inductance "L") in the first lens element 112*a*' relative to the second lens element 112*b*', to thereby facilitate substantially equivalent lower frequency and higher frequency beamwidths across frequencies of the lower and higher frequency bands.

Figure 6B:
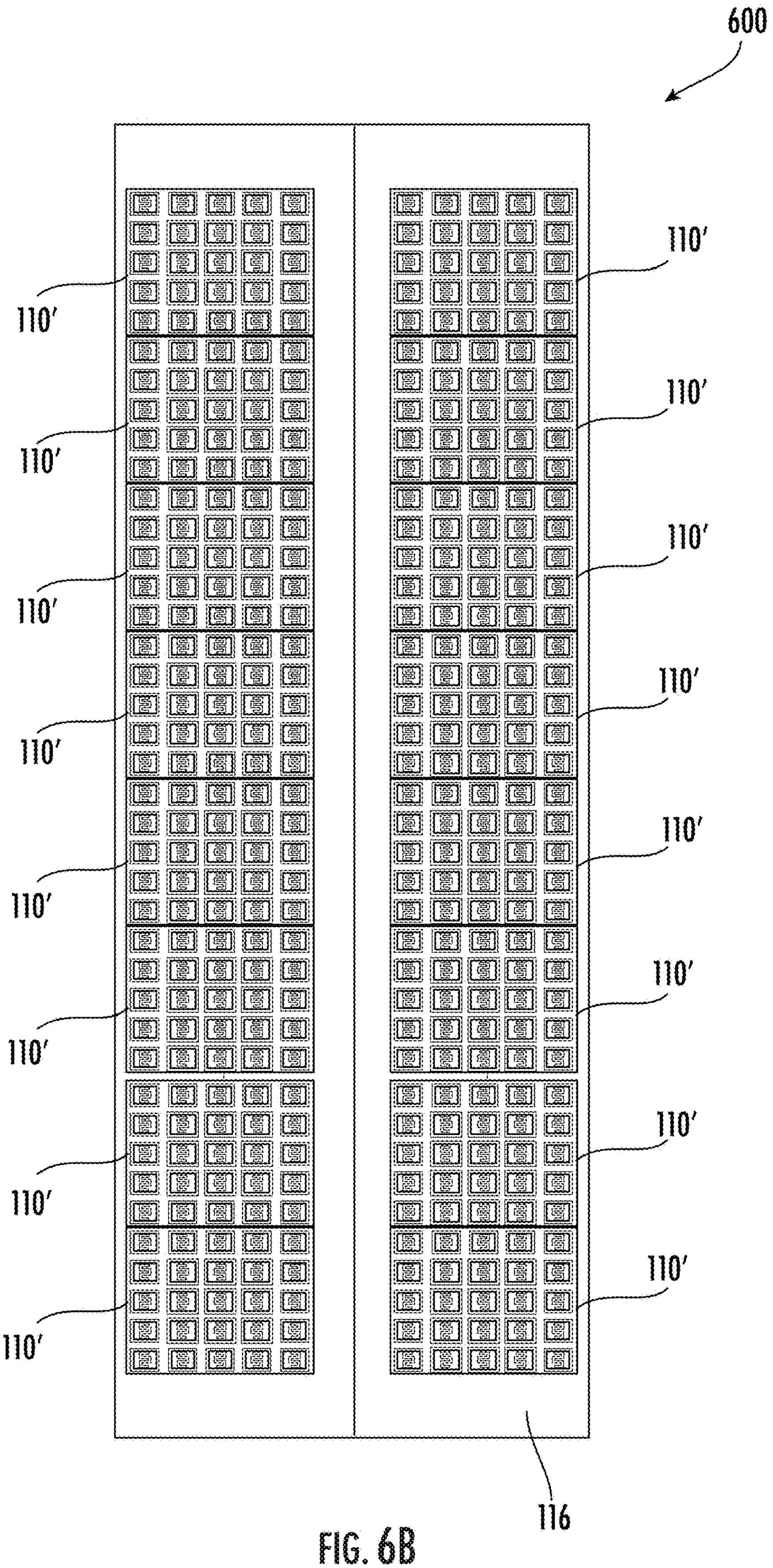
FIG. 6B is a plan view of an antenna having two side-by-side linear columns of eight (8) radiating elements per column on an underlying reflector, and two linear columns of the multi-element broadband lens of FIG. 6A, which are mounted as dual layer lenses in front of the two columns of radiating elements, according to an embodiment of the invention.
Figure 6C:
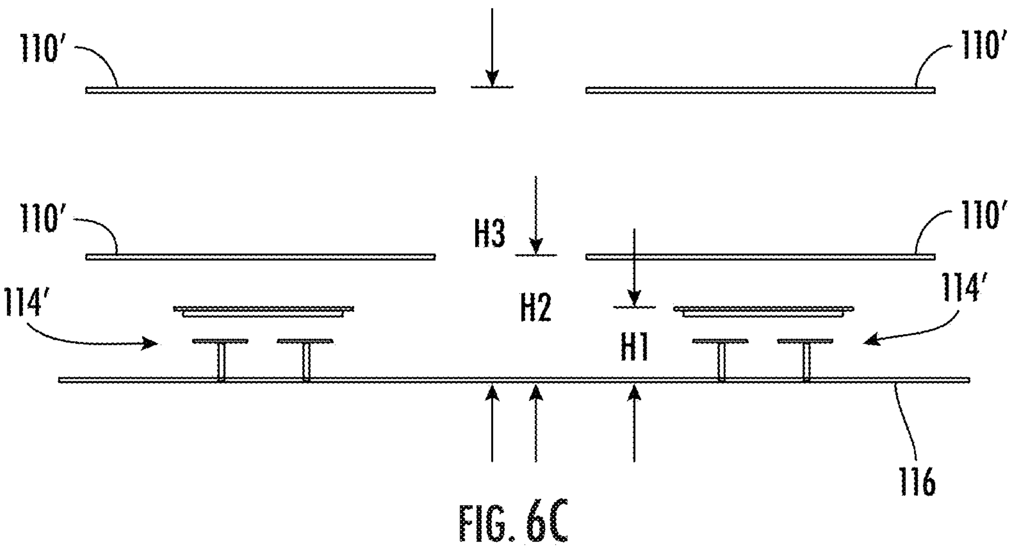
FIG. 6C is an end view of the antenna of FIG. 6B, which includes patch-type radiating elements and a dual layer lens structure, according to an embodiment of the invention.
Figure 6D:
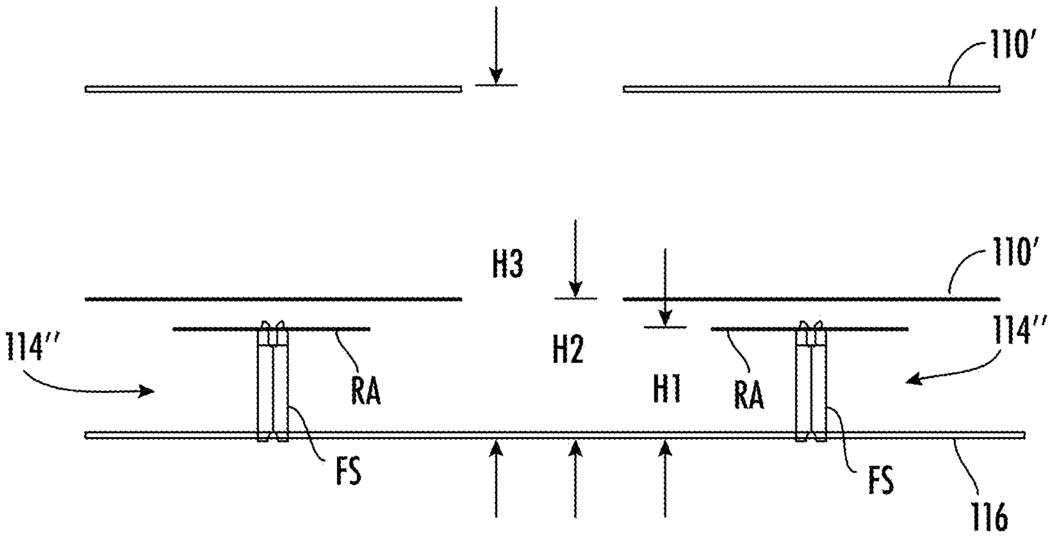
FIG. 6D is an end view of the antenna of FIG. 6B, which includes cross-polarized dipole radiating elements and a dual layer lens structure, according to an embodiment of the invention.

Referring now to FIGS. 6B-6D, an antenna 600 according to another embodiment of the invention is illustrated as including: (i) two side-by-side linear columns of eight (8) radiating elements per column on an underlying reflector 116, and (ii) two linear columns of the multi-element broadband lenses 110' of FIG. 6A, which are mounted as, vertically aligned, dual layer lenses 110' in front of the two columns of radiating elements. As shown by the end view of FIG. 6C, each of the radiating elements may be a patch-type radiating element 114' having a planar patch radiator thereon, which is spaced at a first distance H1 from the underlying reflector 116, whereas each of the dual layer lenses includes a first multi-element broadband lens 110' and a second multi-element broadband lens 110', which are spaced at respective second and third distances H2 and H3 from the underlying reflector 116. As will be understood by those skilled in the art, this patch-type radiating element 114' may be configured as disclosed in PCT Publication No. WO 2020/242783 A2, entitled "Wireless Communication Systems Having Patch-Type Antenna Arrays Therein That Support Large Scan Angle Radiation," the disclosure of which is hereby incorporated herein by reference. Likewise, as shown by FIG. 6D, each of the radiating elements may be a radiating element 114" having cross-polarized dipole radiators (i.e., radiating arms (RA)) thereon, which are spaced (by a feed stalk (FS)) at a first distance H1 from the underlying reflector 116. In addition, each of the dual layer lenses may include a first multi-element broadband lens 110' and a second multi-element broadband lens 110' spaced, and vertically aligned, at respective second and third distances H2 and H3 from the underlying reflector 116, as shown.

Figure 9A:
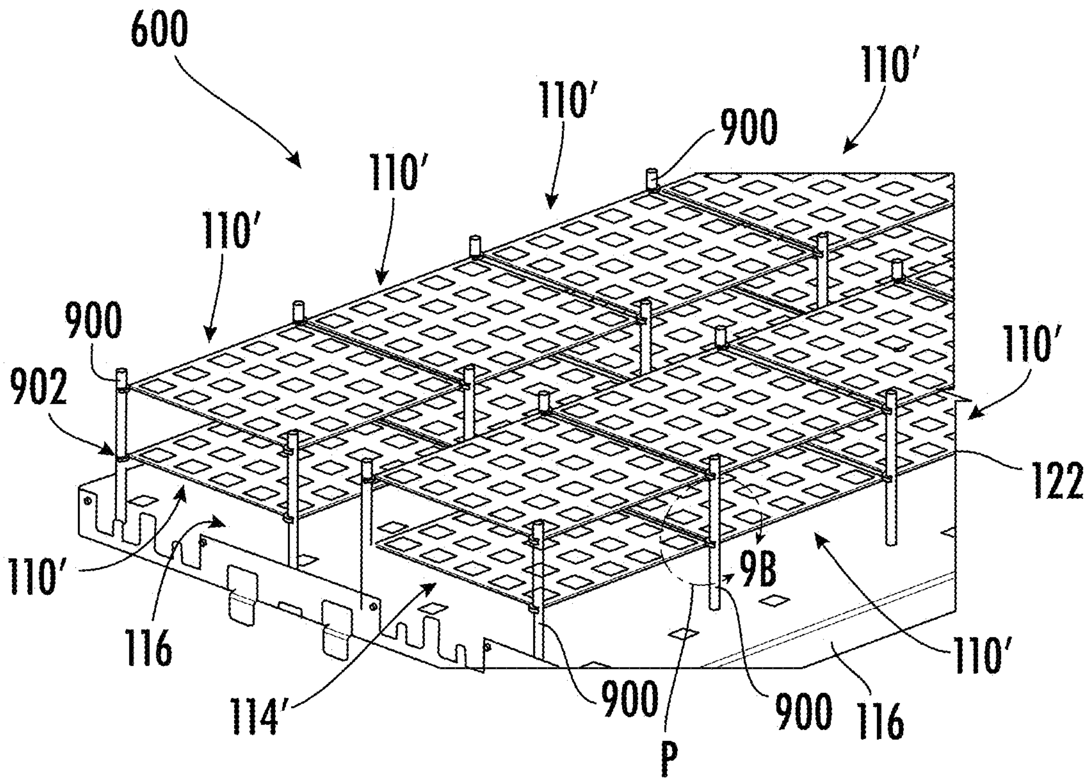
FIG. 9A is a perspective view of the antenna of FIGS. 6A-6C, according to an embodiment of the invention.
Figure 9B:
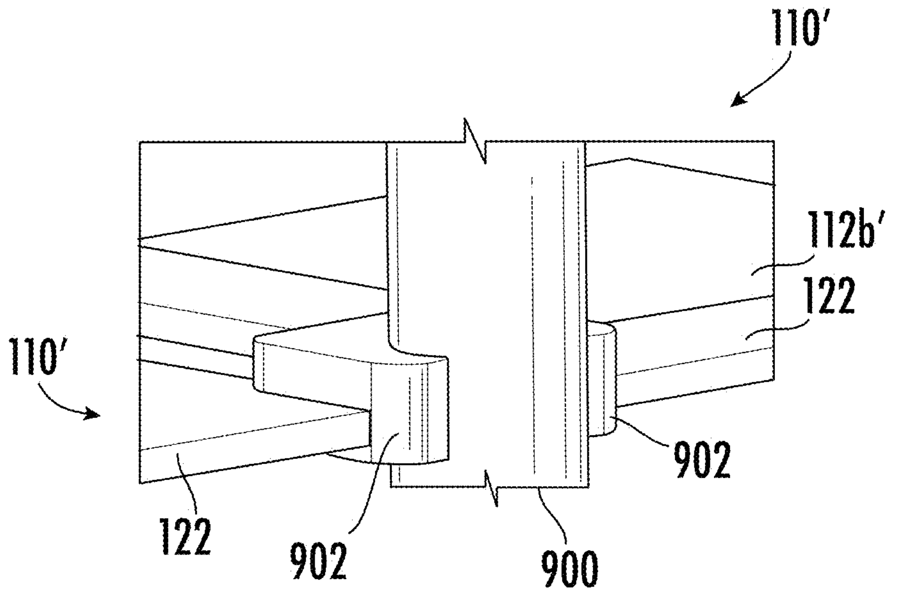
FIG. 9B is an enlarged perspective view of post region "P" highlighted in FIG. 9A, according to an embodiment of the invention.

Referring now to FIGS. 9A-9B, the antenna 600 of FIGS. 6A-6C is further illustrated as including elongate cylindrical posts/rods 900, which are: (i) mounted on, and extend forwardly from, the reflector 166, and (ii) attached at spaced-apart locations along their length to corresponding corners of each of the vertically-aligned arrangement of the multi-element broadband lenses 110', as shown, in order to support/suspend each array of lenses 110' in front of (and within a RF transmission path of) the side-by-side columns of underlying radiating elements 114'. Moreover, as shown by FIG. 9B, which is an enlarged view of highlighted region "P" in FIG. 9A, the posts 900 may utilize connectors 902 (e.g., plastic, snap-fit), which at least partially surround and tightly engage the posts 900 and have recesses therein that receive and attach to corners of the multi-element broadband lenses 110', as shown.

Figure 7A:
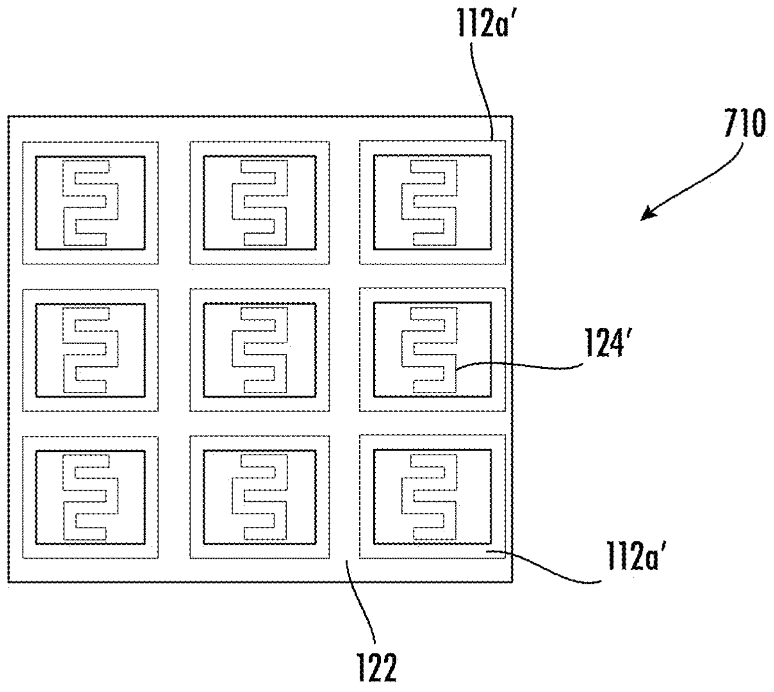
FIG. 7A is a plan view of a 3×3, multi-element, broadband lens, according to an embodiment of the invention.
Figure 7B:
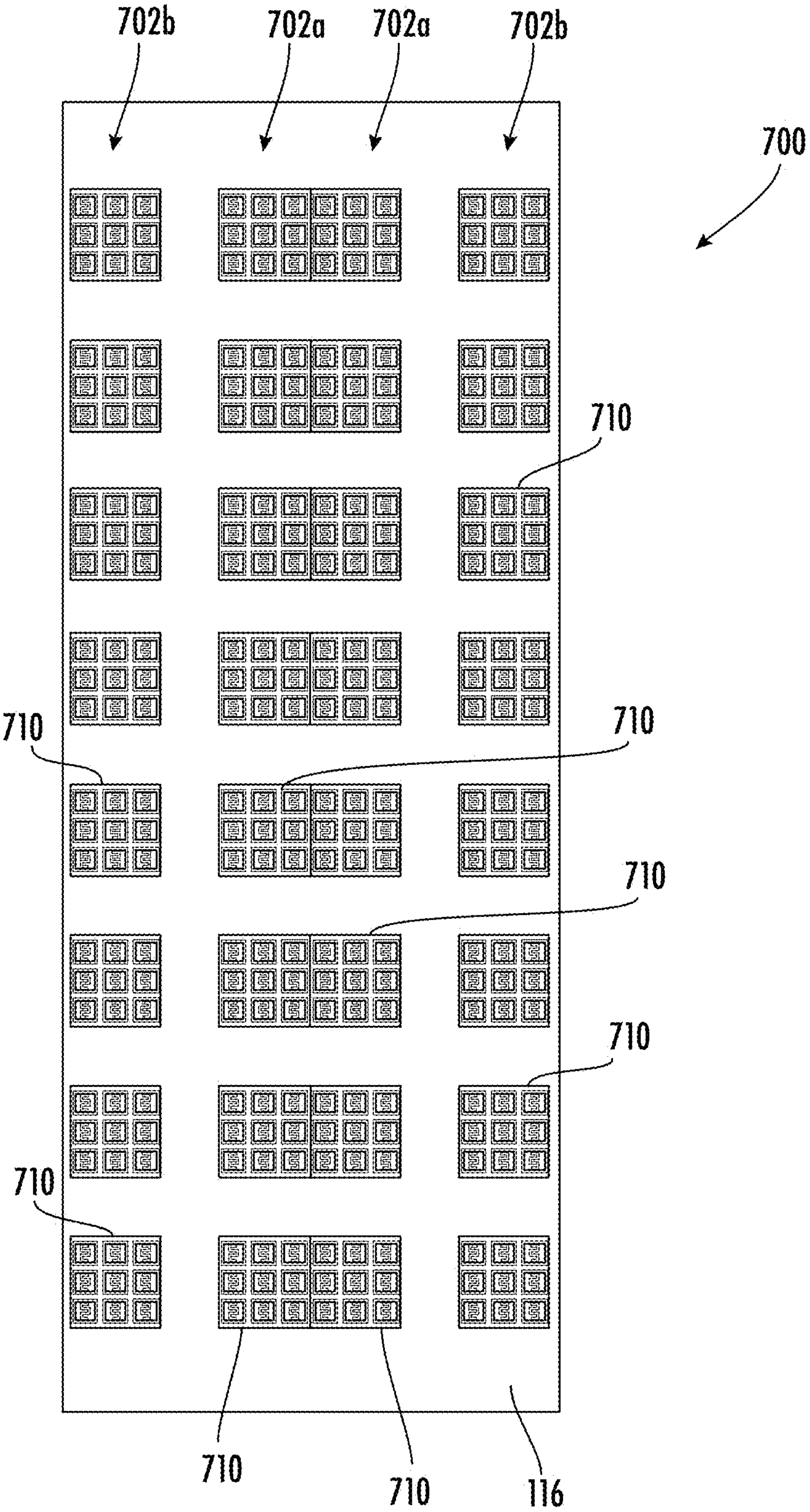
FIG. 7B is a plan view of an antenna having four linear columns of eight (8) radiating elements per column on an underlying reflector, and four linear columns of the multi-element broadband lens of FIG. 7A, which are mounted as dual layer lenses in front of the four columns of radiating elements, according to an embodiment of the invention.
Figure 7C:
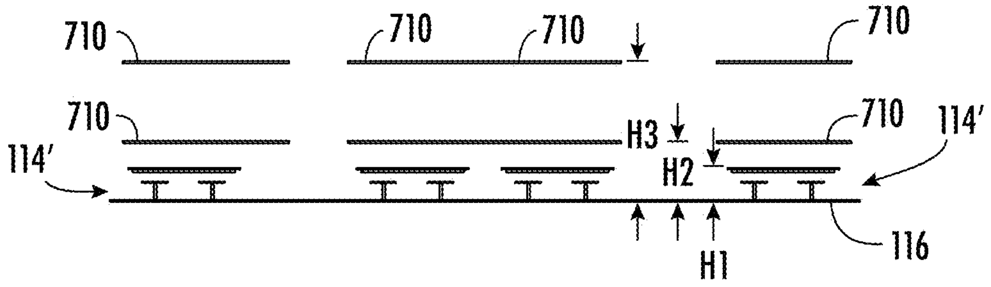
FIG. 7C is an end view of the antenna of FIG. 7B, which includes patch-type radiating elements and a dual layer lens structure, according to an embodiment of the invention.
Figure 7D:
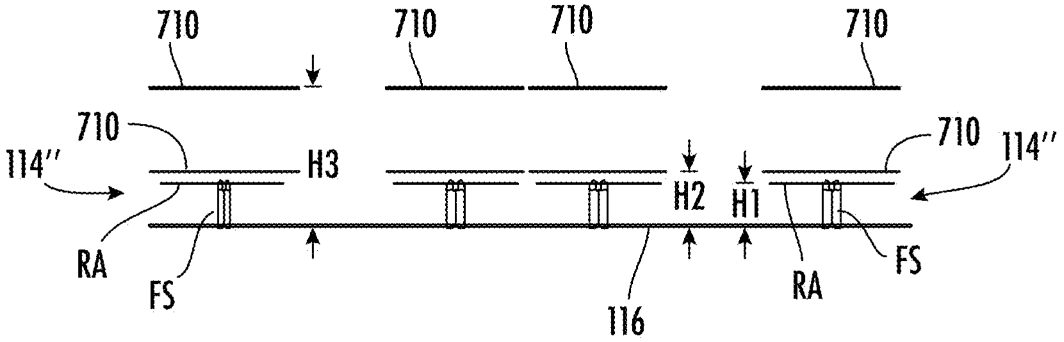
FIG. 7D is an end view of the antenna of FIG. 7B, which includes cross-polarized dipole radiating elements and a dual layer lens structure, according to an embodiment of the invention.

Referring now to FIGS. 7A-7D, multi-element broadband lenses 710 according to other embodiments of the invention are illustrated as including 3×3 arrays of first lens elements 112*a*' therein. Each multi-element broadband lens 710 may be embedded within a planar substrate, which may include a dielectric layer 122, such as a printed circuit board (PCB), and each of the first lens elements 112*a*' may include: (i) a forward-facing electrically conductive/metal layer 120*a*, (ii) a rear-facing electrically conductive/metal layer 120*c*, and (iii) an intermediate electrically conductive/metal layer 120*b* (and slot 124'), as illustrated and described hereinabove with respect to FIG. 1D. As shown by FIGS. 7B-7D, these multi-element broadband lenses 710 may be arranged vertically, in pairs (i.e., as dual layer lenses), in front of corresponding radiating elements of an antenna 700 having: (i) two closely aligned central columns 702*a* of eight (8) radiating elements, and (ii) two outer columns 702*b* of eight (8) radiating elements, which extend adjacent left and right edges of an underlying reflector 116. As shown by FIG. 7C, each of the radiating elements may be a patch-type radiating element 114' having a planar patch radiator thereon, which is spaced at a first distance H1 from the underlying reflector 116, whereas each of the dual layer lenses includes a first, 3×3, multi-element broadband lens 710 and a second, 3×3, multi-element broadband lens 710 spaced at respective second and third distances H2 and H3 from the underlying reflector 116. Likewise, as shown by FIG. 7D, each of the radiating elements may be a radiating element 114" having cross-polarized dipole radiators thereon, which are spaced (by a feed stalk) at a first distance H1 from the underlying reflector 116. In addition, each of the dual layer lenses may include a first multi-element broadband lens 710 and a second multi-element broadband lens 710, which are spaced and vertically aligned/integrated at respective second and third distances H2 and H3 from the underlying reflector 116, as shown.

Referring now to FIGS. 8A-8F, an antenna 800 is illustrated as containing a single row of four (4) cross-polarized dipole radiating elements 114", which are mounted on an underlying reflector 116, and four (4) multi-element, broadband lenses 810 (single, dual, or tri layer) within corresponding planar dielectric layers 122. As shown, each of the broadband lenses 810 includes: (i) a central 3×3 array of first lens elements 112*a*', which are vertically aligned to the underlying radiating arms of the dipole radiating elements 114", and (ii) first and second 1×3 linear arrays of second lens elements 112*b*', which extend on opposite sides of the central 3×3 array of first lens elements 112*a*'. Although not wishing to be bound by any theory of operation or performance, the lateral dimensions of each 3×3 array of first lens elements 112*a*' may define a square portion of a corresponding dielectric layer 122 having: (i) a center that is aligned with a central vertical axis of an underlying radiating element 114", and (ii) a lateral area greater than or equal to a lateral area of the cross-dipole radiating arms supported by the feed stalks within each radiating element 114".

Moreover, as shown by the side view illustrations of FIGS. 8B-8F and Tables 1-2, various performance parameters (e.g., beamwidths (azimuth, elevation), directivity) can be optimized for desired applications by selecting between single, dual, and tri layer lens configurations, and adjusting lens height and vertical lens-to-lens spacing, etc. For example, as shown by the fifth column of Table 1 and FIG. 8B, which is an end view of the antenna 800 of FIG. 8A containing: (i) tri layer lenses 810 at heights L1 (66.9 mm), L2 (116.9 mm) and L3 (166.9 mm) from the reflector 116, and (ii) radiating elements 114" having horizontal cross-dipole radiating arms (RA) at heights H1 (52.2 mm), relatively narrow azimuth and elevation beamwidths (AZBW_3 dB, AZBW_10 dB, and ELBW_3 dB) may be achieved with relatively high directivity (3D directivity) for a relatively wide first RF band (617-960 MHz), having a center frequency of 788 MHz (and $\lambda/4 \sim 95$ mm), and a somewhat narrower second RF band (617-806 MHz), having a center frequency of 711.5 MHz (and $\lambda/4 \sim 105$ mm), and where $\Delta L = (L2 - L1) = (L3 - L2) \sim \lambda/8$. In contrast, as shown by the fourth column of Table 1 and FIG. 8C, which is an end view of the antenna 800 of FIG. 8A containing: (i) dual layer lenses 810 at heights L1 (68.9 mm) and L2 (166.9 mm) from the reflector 116, and (ii) radiating elements 114" having horizontal cross-dipole radiating arms (RA) at heights H1 (52.2 mm), slightly wider azimuth beamwidths (AZBW_3 dB, AZBW_10 dB) and slightly narrower elevation beamwidths (ELBW_3 dB) may be achieved (with equivalent directivity) for the first and second first RF bands, relative to the tri layer lens embodiment of FIG. 8B.

Figure 8A:
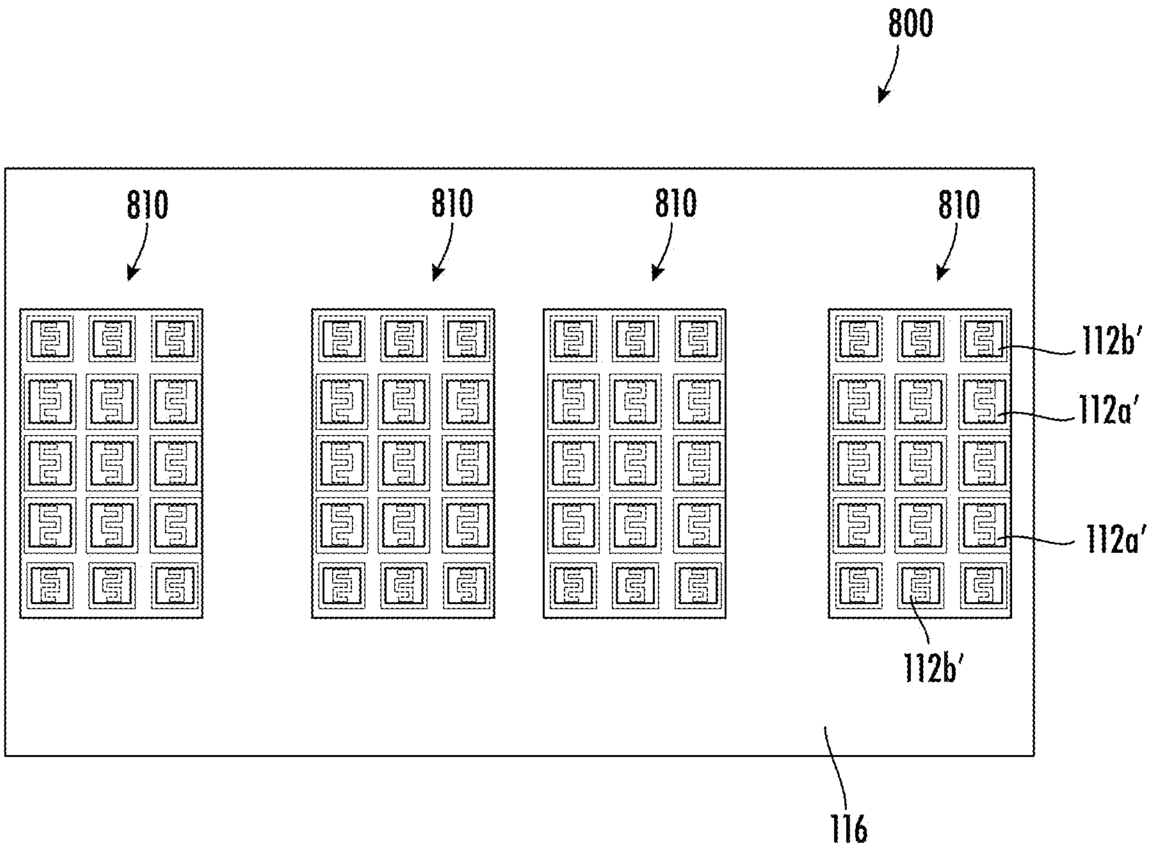
FIG. 8A is a plan view of an antenna containing a single row of four radiating elements, and a row of four, multi-element, broadband lenses (single, dual, or tri layer) containing a central 3×3 array of first lens elements and two 1×3 linear arrays of second lens elements, according to an embodiment of the invention.
Figure 8B:
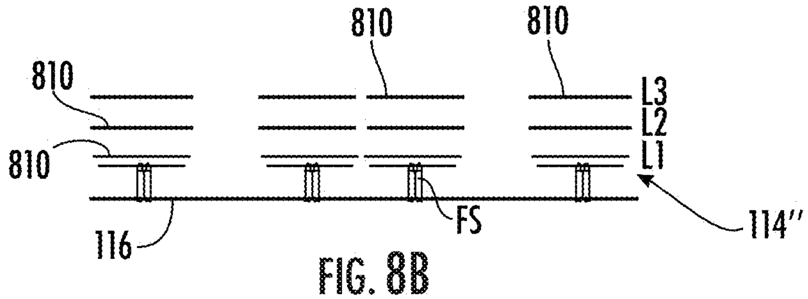
FIG. 8B is an end view of the antenna of FIG. 8A containing tri layer lenses, according to an embodiment of the invention.
Figure 8C:
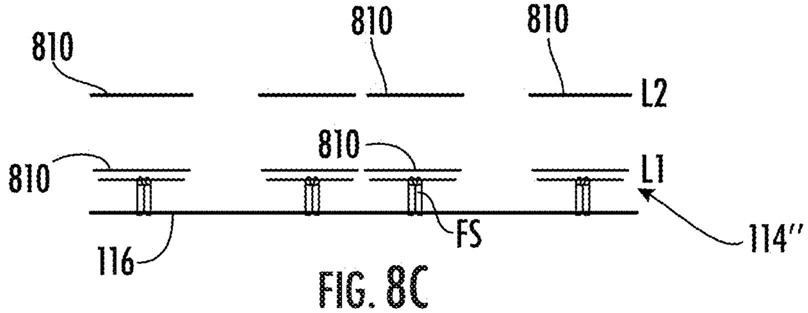
FIG. 8C is an end view of the antenna of FIG. 8A containing dual layer lenses, according to an embodiment of the invention.
Figure 8D:
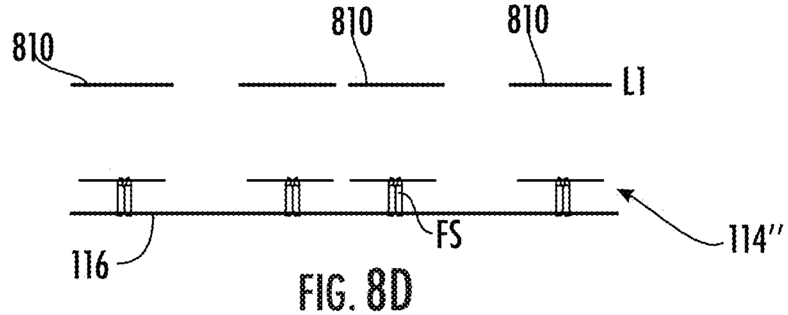
FIG. 8D is an end view of the antenna of FIG. 8A containing single layer lenses, according to an embodiment of the invention.

Next, as shown by the third column of Table 1 and FIG. 8D, which is an end view of the antenna 800 of FIG. 8A containing a single lens 810 at height L1 (166.9 mm) from the reflector 116, and radiating elements 114" having horizontal cross-dipole radiating arms (RA) at heights H1 (52.2 mm), somewhat wider azimuth and elevation beamwidths and lower directivity may be achieved, relative to the dual layer and tri layer lens embodiments of FIGS. 8B-8C. And, as shown by the second column of Table 1 and FIG. 8E, which is an end view of the antenna 800 of FIG. 8A containing a single lens 810 at a relatively low height L1 (66.9 mm) from the reflector 116, and radiating elements 114" having horizontal cross-dipole radiating arms (RA) at heights H1 (52.2 mm), significantly wider azimuth and elevation beamwidths and lower directivity may be achieved, relative to the single lens embodiment of FIG. 8D. Finally, as shown by the first column of Table 1 and FIG. 8F, which is an end view of the antenna 800 of FIG. 8A, but without any lenses, generally better azimuth beamwidth performance may be achieved compared to the positioning of a single lens 810 in very close proximity to the radiating elements 114" (i.e., 14.7 mm=66.9 mm−52.2 mm), as shown by the second column of Table 1 and FIG. 8E.

TABLE 1

Figure 8E:
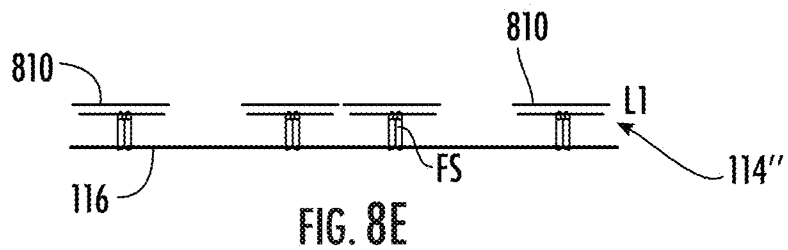
FIG. 8E is an end view of the antenna of FIG. 8A containing single layer lenses, according to an embodiment of the invention.
Figure 8F:
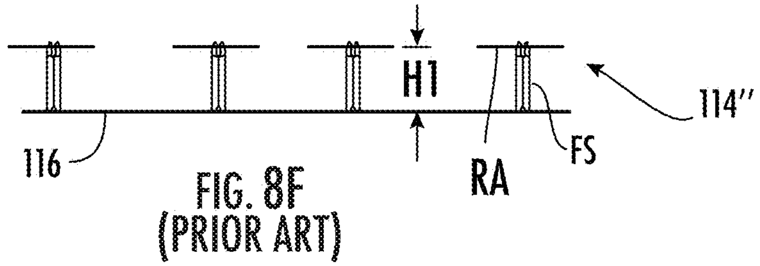
FIG. 8F (PRIOR ART)
FIG. 8F is an end view of the antenna of FIG. 8A, but with all broadband lenses removed, according to the prior art.

| | No Lens Height: 52.2 mm FIG. 8F | Single Lens Height: 66.9 mm FIG. 8E | Single Lens Height: 166.9 mm FIG. 8D | Dual Layer Lens Height: 166.9 mm FIG. 8C | Tri Layer Lens Height: 166.9 mm FIG. 8B |
|---|---|---|---|---|---|
| Frequency (MHz) | 617-960/617-806 | 617-960/617-806 | 617-960/617-806 | 617-960/617-806 | 617-960/617-806 |
| 3D Directivity | 11.5/11.2 | 11.6/11.3 | 12.6/11.7 | 13/12.1 | 13/12.1 |
| AZBW_3 dB | 37.6/40.8 | 40.5/44.8 | 35.5/38.8 | 34.5/37.5 | 33.6/36.9 |
| AZBW_10 dB | 64.3/70.5 | 69/76.9 | 63.8/70.1 | 63.2/69.5 | 61.4/67.9 |
| ELBW_3 dB | 66/62.9 | 58.8/58.1 | 53.7/57.2 | 48.5/51.5 | 49.2/52 |

Finally, referring now to FIG. 8C and Table 2, it can be seen that reducing a gap between the "L2" and "L1" lenses from 98 mm to 48 mm can yield a slight reduction in the azimuth beamwidths for the first RF band (617-960 MHz), but at the expense of greater elevation beamwidths and somewhat lower directivity. (See, e.g., Comparison 1). In contrast, increasing the height of the "L2" and "L1" lenses to 254.2 mm and 156.2 mm, respectively, can yield slight improvements in directivity, a narrowing of elevation beamwidths, and a narrowing of azimuth beamwidths for the second RF band (617-806 MHz). (See, e.g., Comparison 2).

TABLE 2

| | Dual Layer Lens L2: 166.9 mm L1: 68.9 mm (Gap: 98 mm) H1: 52.2 mm FIG. 8C | Dual Layer Lens L2: 166.9 mm L1: 118.9 mm (Gap: 48 mm) H1: 52.2 mm Comparison 1 | Dual Layer Lens L2: 254.2 mm L1: 156.2 mm (Gap: 98 mm) H1: 52.2 mm Comparison 2 |
|---|---|---|---|
| Frequency (MHz) | 617-960/617-806 | 617-960/617-806 | 617-960/617-806 |
| 3D Directivity | 13/12.1 | 12.7/11.8 | 13/13.1 |
| AZBW_3 dB | 34.5/37.5 | 34.2/38 | 34.2/35.1 |
| AZBW_10 dB | 63.2/69.5 | 61.7/69.5 | 64/66.6 |
| ELBW_3 dB | 48.5/51.5 | 53.7/56.5 | 46.6/46.2 |

In the drawings and specification, there have been disclosed example embodiments of the invention and, although specific terms are employed, they are used in a generic and descriptive sense only and not for purposes of limitation, the scope of the invention being set forth in the following claims.

What is claimed is:

1. An antenna, comprising:

a radiating element on a forward-facing surface of an underlying reflector; and a lens extending in front of and within a radio frequency (RF) transmission path of the radiating element, said lens comprising a two-dimensional array of lens elements having at least three rows and at least three columns therein, said array including:

a first row of equivalently-sized lens elements having geometric centers that are collinear with each other;

a last row of equivalently-sized lens elements having geometric centers that are collinear with each other;

an intermediate row of lens elements having geometric centers that are collinear with each other, extending between the first and last rows of lens elements;

a first column of equivalently-sized lens elements having geometric centers that are collinear with each other, with said first column of lens elements including first and second lens elements within the first and last rows of lens elements, respectively;

a last column of equivalently-sized lens elements having geometric centers that are collinear with each other, with said last column of lens elements including third and fourth lens elements within the first and last rows of lens elements, respectively; and an intermediate column of lens elements having geometric centers that are collinear with each other, extending between the first and last columns of lens elements;

wherein each of the lens elements in the intermediate row includes a respective forward-facing metal surface having a respective metal opening therein;

wherein each of the lens elements in the intermediate column includes a respective forward-facing metal surface having a respective metal opening therein;

wherein the metal openings associated with all the lens elements in the intermediate row have geometric centers that are collinear with each other; and wherein the metal openings associated with all the lens elements in the intermediate column have geometric centers that are collinear with each other.

2. The antenna of claim 1, wherein a plurality of the metal openings associated with the lens elements in the intermediate row have unequal sizes; and wherein a plurality of the metal openings associated with the lens elements in the intermediate column have unequal sizes.

3. The antenna of claim 2, wherein the forward-facing metal surfaces of the lens elements in the intermediate row are spaced apart from each other; and wherein the forward-facing metal surfaces of the lens elements in the intermediate column are spaced apart from each other.

4. The antenna of claim 2, wherein the plurality of the metal openings associated with the lens elements in the intermediate row have equivalent shapes; and wherein the plurality of the metal openings associated with the lens elements in the intermediate column have equivalent shapes.

5. The antenna of claim 4, wherein the forward-facing metal surfaces of the lens elements in the intermediate row have shapes that differ from the shapes of their respective metal openings.

6. The antenna of claim 1, wherein the lens is a planar lens.

7. The antenna of claim 1, wherein the forward-facing metal surfaces of the lens elements in the intermediate row are coplanar.

8. The antenna of claim 7, wherein the forward-facing metal surfaces of the lens elements in the intermediate column are coplanar.

9. The antenna of claim 1, wherein the two-dimensional array of lens elements extend within a single unitary body.

10. The antenna of claim 1, wherein the two-dimensional array of lens elements includes at least five rows and at least five columns therein.

11. An antenna, comprising:

a radiating element on a forward-facing surface of an underlying reflector; and a lens extending in front of and within a radio frequency (RF) transmission path of the radiating element, said lens comprising a two-dimensional array of lens elements having at least three rows and at least three columns therein, said array including:

a first row of equivalently-sized lens elements having geometric centers that are collinear with each other when viewed from a plan layout perspective that faces a forward facing surface(s) of the lens;

a last row of equivalently-sized lens elements having geometric centers that are collinear with each other when viewed from the plan layout perspective;

an intermediate row of lens elements having geometric centers that are collinear with each other when viewed from the plan layout perspective, extending between the first and last rows of lens elements;

a first column of equivalently-sized lens elements having geometric centers that are collinear with each other when viewed from the plan layout perspective, with said first column of lens elements including first and second lens elements within the first and last rows of lens elements, respectively;

a last column of equivalently-sized lens elements having geometric centers that are collinear with each other when viewed from the plan layout perspective, with said last column of lens elements including third and fourth lens elements within the first and last rows of lens elements, respectively; and an intermediate column of lens elements having geometric centers that are collinear with each other when viewed from the plan layout perspective, extending between the first and last columns of lens elements;

wherein each of the lens elements in the intermediate row includes a respective forward-facing metal surface having a respective metal opening therein;

wherein each of the lens elements in the intermediate column includes a respective forward-facing metal surface having a respective metal opening therein;

wherein the metal openings associated with all the lens elements in the intermediate row have geometric centers that are collinear with each other when viewed from the plan layout perspective; and wherein the metal openings associated with all the lens elements in the intermediate column have geometric centers that are collinear with each other when viewed from the plan layout perspective.

12. The antenna of claim 11, wherein a plurality of the metal openings associated with the lens elements in the intermediate row have unequal sizes; and wherein a plurality of the metal openings associated with the lens elements in the intermediate column have unequal sizes.

13. The antenna of claim 12, wherein the forward-facing metal surfaces of the lens elements in the intermediate row are spaced apart from each other; and wherein the forward-facing metal surfaces of the lens elements in the intermediate column are spaced apart from each other.

14. The antenna of claim 12, wherein the plurality of the metal openings associated with the lens elements in the intermediate row have equivalent shapes; and wherein the plurality of the metal openings associated with the lens elements in the intermediate column have equivalent shapes.

15. The antenna of claim 14, wherein the forward-facing metal surfaces of the lens elements in the intermediate row have shapes that differ from the shapes of their respective metal openings.

16. The antenna of claim 11, wherein the two-dimensional array of lens elements extend within a single unitary body.

17. The antenna of claim 11, wherein the two-dimensional array of lens elements includes at least five rows and at least five columns therein.

* * * * *